US008751202B2

(12) United States Patent
Powell

(10) Patent No.: US 8,751,202 B2
(45) Date of Patent: Jun. 10, 2014

(54) SYSTEM AND METHOD FOR GENERATING FINITE ELEMENT MODELS

(75) Inventor: Donald T. Powell, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/457,269

(22) Filed: Apr. 26, 2012

(65) Prior Publication Data

US 2012/0209577 A1 Aug. 16, 2012

Related U.S. Application Data

(63) Continuation of application No. 11/805,449, filed on May 23, 2007, now Pat. No. 8,195,434, which is a continuation-in-part of application No. 09/952,026, filed on Sep. 12, 2001, now abandoned.

(51) Int. Cl.
*G06F 7/60* (2006.01)
*G06F 17/10* (2006.01)

(52) U.S. Cl.
USPC ............................................... 703/2

(58) Field of Classification Search
USPC ............................................... 703/2
See application file for complete search history.

(56) References Cited

U.S. PATENT DOCUMENTS

| 4,858,146 | A | * | 8/1989 | Shebini | 703/1 |
|---|---|---|---|---|---|
| 5,191,534 | A | | 3/1993 | Orr et al. | |
| 5,319,567 | A | * | 6/1994 | Ebenstein | 700/192 |
| 5,384,717 | A | * | 1/1995 | Ebenstein | 702/167 |
| 5,414,647 | A | * | 5/1995 | Ebenstein et al. | 702/167 |
| 5,418,728 | A | | 5/1995 | Yada et al. | |
| 5,442,572 | A | * | 8/1995 | Kiridena et al. | 382/141 |
| 5,546,328 | A | * | 8/1996 | Kiridena et al. | 700/279 |
| 5,581,489 | A | | 12/1996 | Groothuis et al. | |
| RE36,602 | E | | 3/2000 | Sebastian et al. | |
| 6,073,056 | A | * | 6/2000 | Gawronski et al. | 700/98 |
| 6,195,594 | B1 | | 2/2001 | Shah et al. | |
| 6,230,066 | B1 | | 5/2001 | Sferro et al. | |
| 8,195,434 | B2 | | 6/2012 | Powell | |
| 2003/0048269 | A1 | | 3/2003 | Powell et al. | |
| 2007/0288210 | A1 | | 12/2007 | Powell | |

OTHER PUBLICATIONS

Lipman, Using PATRAN and SUPERTAB as Pre-and Postprocessors to COSMIC/NASTRAN, in: Proceedings of 17th NASTRAN Users' Colloquium, Apr. 1989, San Antonio, TX, National Aeronautics and Space Administration, NASA CP-3029, (11 pgs).
SDRC SUPERTAB—Interactive Graphics as a Front-End, www.mscsoftware.com/support/library/conf/wuc79/p01479.pdf, document created Jul. 12, 2000, (15 pgs).
White Paper: Practical Approaches to Engineering Analysis, Integrated Technologies Engineering, 1997, IT Engineering, Milford, OH, pp. 1-32.
Napolitano, Jr., L.M., A Computer Architecture for Dynamic Finite Element Analysis, International Symposium on Computer Architecture, Proceedings of the 13th Annual International Symposium on Computer Architecture, 1986, IEEE Computer Society Press, Los Alamitos, CA, pp. 316-323.

(Continued)

*Primary Examiner* — Saif Alhija
(74) *Attorney, Agent, or Firm* — Toler Law Group, PC

(57) ABSTRACT

A method includes determining, at a processor, whether a number of points of drawing data associated with a part satisfies a threshold. The method further includes identifying the drawing data as validated geometry data when the number of points satisfies the threshold.

20 Claims, 33 Drawing Sheets

(56) References Cited

OTHER PUBLICATIONS

Lee, Y.T., Automatic Finite-Element Mesh Generation from Geographic Models—A Point-Based Approach, ACM Transactions on Graphics, vol. 3, No. 4, Oct. 1984, pp. 287-311.

Grosso, R. et al., The Multilevel Finite Element Method for Adaptive Mesh Optimization and Visualization of Volume Data, In Proceedings Visualization, 1997, IEEE Computer Society Press, Los Alamitos, CA, pp. 387-394.

Budgell, P. ANSYS Tips and Tricks, http://www3.sympatico.ca/peter_budgeII/ANSYS_tips.html, 1998, Burlington, Ontario, Canada, pp. 1-65.

* cited by examiner

262

| File | Edit | Search | Preferences | Shell | Macro | Windows | | | Help |
|------|------|--------|-------------|-------|-------|---------|---|---|------|

```
                    HINGES - FANCOWL

LEFT SIDE STRUCTURE
CROD       74012     7400      74501     79501

CELAS2     74521    .10E+08    74502            1    39502           1
CELAS2     74522    .10E+08    39502            2    39502           2
CELAS2     74523    .10E+08    39502            3    74502           3

CELAS2     74532    .10E+08    573003           2    74503           2
CELAS2     74533    .10E+08    573003           3    74503           3

RIGHT SIDE STRUCTURE

CELAS2     79521    .10E+08    79502            1    39552           1
CELAS2     79522    .10E+08    79502            2    39552           2
CELAS2     79523    .10E+08    39552            3    79502           3

CELAS2     79532    .10E+08    79503            2    573503          2
CELAS2     79533    .10E+08    573503           3    79503           3

Rod material & prop are default
PROD       7400     740        1.00
PDM-4090   7075-16 & 7075-T62 ALUMINUM
MAT1       740      10.3E6     3.90E6     33    1010    0000    0000    1333
```

FIG.9L

| Station Report | | | | |
|---|---|---|---|---|
| DATE: 08/10/01 Data read from: 777IFEM.incl.dat | | | | |
| DESCRIPTION | | NSTA | NBL | NWL |
| FAN COWL HINGE #2 RHS | | 172,000, | 14,000, | 180,000, |
| FAN COWL HINGE #3 RHS | | 192,870, | 14,000, | 180,000, |
| DESCRIPTION | | NSTA | NBL | NWL |
| FAN COWL LATCH #1 | | 68,820, | 180,000, | 152,000, |
| FAN COWL LATCH #2 | | 65,430, | 180,000, | 172,000, |
| FAN COWL LATCH #3 | | 64,430, | 180,000, | 192,000, |
| FAN COWL LATCH #4 | | 64,230, | 180,000, | 212,240, |
| DESCRIPTION | | NSTA | NBL | NWL |
| THRUST REVERSER HINGE #2 RHS | | 235,650, | 14,770, | 155,180, |
| THRUST REVERSER HINGE #3 RHS | | 280,520, | 14,770, | 155,180, |
| DESCRIPTION | | NSTA | NBL | NWL |
| THRUST REVERSER HINGE #1 | | 56,050, | 180,000, | 223,480, |
| THRUST REVERSER HINGE #2 | | 56,050, | 180,000, | 239,210, |
| THRUST REVERSER HINGE #3 | | 56,050, | 180,000, | 268,520, |
| THRUST REVERSER HINGE #4 | | 56,050, | 180,000, | 281,840, |

*FIG. 9N*

SYSTEM AND METHOD FOR GENERATING FINITE ELEMENT MODELS

CROSS-REFERENCE TO RELATED APPLICATIONS

This application claims priority from and is a continuation of U.S. patent application Ser. No. 11/805,449, entitled "SYSTEM AND METHOD FOR GENERATING FINITE ELEMENT MODELS," filed May 23, 2007, which claims priority from and is a continuation-in-part of U.S. patent application Ser. No. 09/952,026, entitled, "SYSTEM AND METHOD FOR GENERATING FINITE ELEMENT MODELS," filed Sep. 12, 2001, the contents of both of which are expressly incorporated herein by reference.

BACKGROUND

Designing and building complex systems, such as aircraft, space vehicles, marine vessels, marine platforms such as oil rigs, land vehicles such as automobiles and trucks, and the like, is a complex process that involves several disciplines. For example, typically several years of design, testing, analysis, and systems integration are performed before a complex system is put into operation. Furthermore, before a component, subassembly, or assembly is built, a design for the component, subassembly, or assembly is analyzed.

Such an analysis typically entails generating a mathematical model, such as a finite element model, of the component, subassembly, or assembly. The finite element model is a three dimensional, mathematical definition of a component. The model includes surfaces and exhibits geometric properties, material properties, mass, stiffness, and the like. The finite element model can be subjected to static and dynamic testing. Thus, use of mathematical models such as finite element models greatly reduces time and labor to analyze components over building, testing, and analyzing physical models.

However, generating finite element models of components or subassemblies in complex systems, using currently known methods, is a time-consuming and labor-intensive process. Further, generating finite element models of components in complex systems entails engineering efforts across several disciplines. For example, developing a finite element model for all of the major components for mounting an engine under a wing of a commercial airplane, involves a cross-disciplinary team of loads engineers, stress engineers, designers, and weights engineers.

Typically, engineers from each discipline will develop, from a set of requirements, a preliminary design document. From the preliminary design document, a designer configures a two-dimensional centerline preliminary design drawing. The preliminary design drawing represents definition of lines of a component, but the preliminary design drawing does not represent structure of the component. A designer takes the line definition from the preliminary design drawing and develops structural definition for the component. Structural definition includes assigning properties and materials, and gages. Next, a designer generates surfaces for the component based on the structural definition. Surface generation is a very detailed, time-consuming process.

In a series of manual operations, a modeler takes required information off the structural definition to generate a finite element model of the component. Generating the finite element model includes generating surfaces, structural breaks, and properties and materials for the component.

The surface geometry is transferred from a CAD computing environment to a modeling-computing environment such as UNIX. Because manually generated surfaces typically include flaws, the surfaces are cleaned up. For example, meshing operations in commercially-available modeling software may introduce surface flaws. In most cases, a surface is so flawed that the surface must be re-created.

Each surface is mesh-seeded. If the surface is not corrupted, grid and nodal generation is completed as desired. A limited number assignment to the mesh, that is grid and element numbers, is created.

Property and materials are assigned to the created elements. Mass is evaluated and changed, if desired. Finally, numbering errors are manually modified to allow proper interfacing with other finite element models.

The above process results in just one iteration of each component being modeled. Each model can then be subject to static and dynamic testing, as desired or required. Finally, all the finite element models are integrated into a model of a subassembly or assembly. Integration of the component models involves determining connection points and interface connections. When the component models are integrated into an integrated finite element model, documentation of the model is generated, and the model is released. The above process can take thousands of labor hours and hundreds of manufacturing days, and results in just one iteration of an integrated finite element model.

As a result, a first iteration of an integrated finite element model may not be released until well after a 25% design review and may not be released until a 90% design review. Such a long analysis cycle time introduces program risk and is unresponsive to unanticipated growth of work statements in complex system integration projects. Further, such a process is unresponsive to design changes.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be exemplary and illustrative, not limiting in scope. In various embodiments, one or more of the problems described above in the Background have been reduced or eliminated, while other embodiments are directed to other improvements.

According to an exemplary embodiment, geometry data can be extracted from a drawing file. A drawing file and an interface application are activated. Geometry data is extracted from the drawing file with the interface application.

According to an aspect, in extracting geometry data, a type of part to be modeled is selected, geometry of the type of part to be modeled is identified, identified geometry of the type of part to be modeled is validated, and the validated identified geometry is written to a data file.

According to another aspect, desired geometry may be identified by scanning the activated drawing file for component nomenclature that matches component nomenclature in a finite element model generation application. According to another aspect, when the drawing file includes data for a product, control data that identifies validated identified geometry of component parts of a product is written to a control file.

According to another exemplary embodiment, geometry data can be read from a geometry data file. A geometry data file to be read is selected with an interface application. Contents of the selected geometry data file are automatically read into a drawing application such that a drawing file is created. According to an aspect, before a geometry data file is selected to be read, the contents of the geometry data file may be revised. In such a case, the revised geometry data file can be selected from the interface application, and the contents of the selected revised geometry data file are automatically read into a drawing application to create a revised drawing file.

According to another exemplary embodiment, a finite element model can be generated. A control file for an item to be modeled is selected. Contents of the selected control file are read, and contents of all part geometry data files identified in the selected control file are read. A finite element model for each part is generated simultaneously from all of the part geometry data files.

According to an aspect, when more than one part geometry data files are identified in the control file, all of the finite element models of the parts can be integrated into a finite element model of a product.

In addition to the exemplary embodiments and aspects described above, further embodiments and aspects will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Disclosed are a system and method for automatically and rapidly generating a finite element model of a component. A two-dimensional diagram of points and lines that represent the geometry of a component is created. A first input file is created from the two-dimensional diagram. The first input file defines geometrical structure of the component. A second input file is created that defines properties and materials of the components. The properties and materials are defined responsive to the geometrical structure of the component, and are defined according to a predetermined set of properties and materials rules for the component. Without any surfaces being generated to define geometrical structure of the component, a finite element model of the component is generated from the defined geometrical structure of the component and the defined properties and materials of the component.

An exemplary host platform will first be described. Then, routines for performing a method will be described. Finally, a non-limiting example of model generation according to an embodiment will be described.

Exemplary Host Platform

Figure 1:
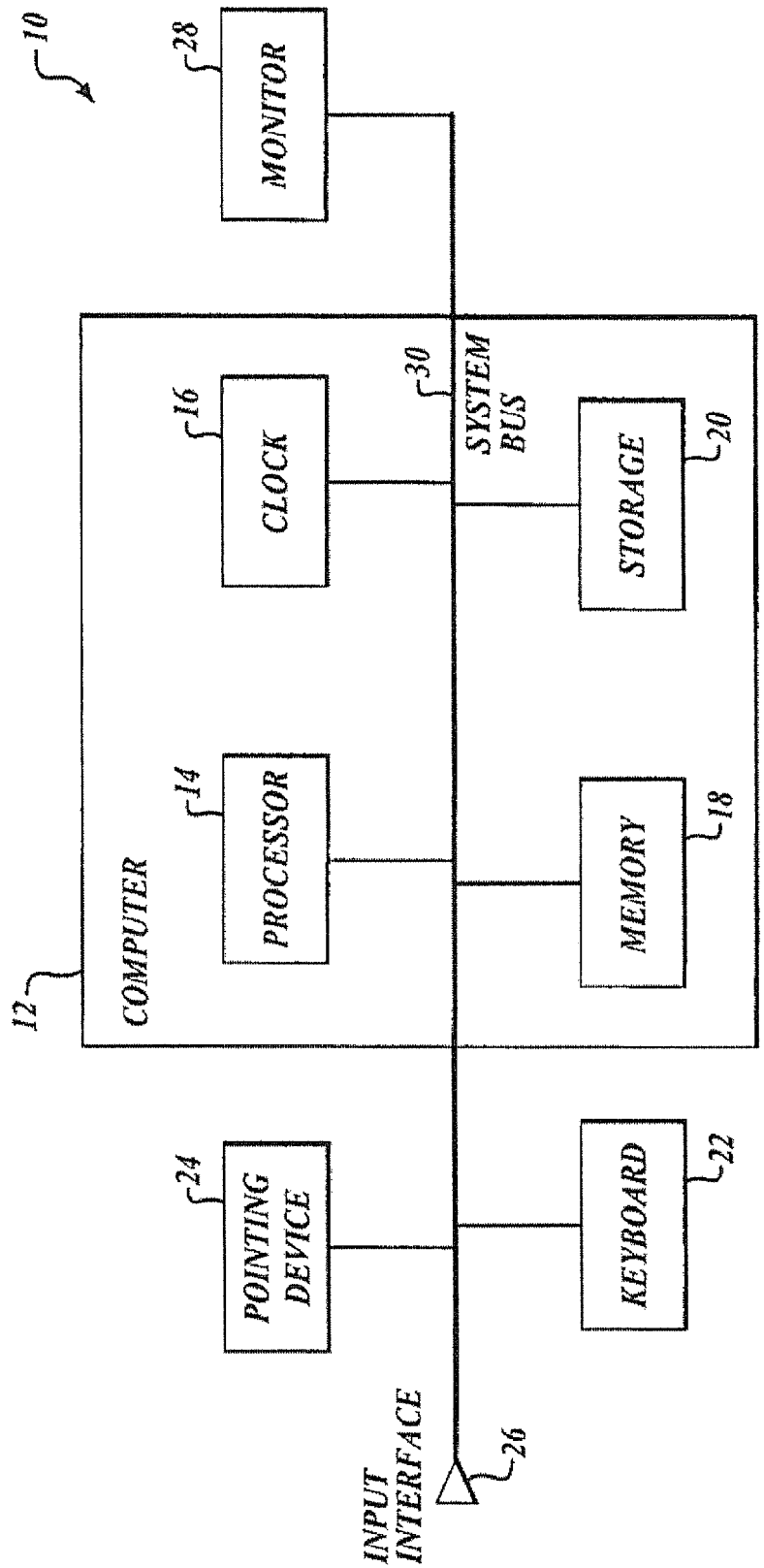
FIG. 1 is a block diagram of an exemplary host platform.

FIG. 1 shows a block diagram of an exemplary host platform 10 that is suitable for hosting software routines according to an embodiment. The platform 10 includes a computer 12. The computer 12 is suitably any computer that is arranged for performing computer-aided-design (CAD) functions or computer-aided-engineering (CAE) functions. As is known, the computer 12 includes a processor 14 that is controlled by a clock 16. The computer 12 also includes memory 18, such as random access memory (RAM). The computer 12 also includes storage 20 such as a hard disc drive, a compact disc (CD) drive, a zip disc drive, a floppy disc drive, or the like. The computer 12, including the processor 14, is suitably arranged to operate in any acceptable operating system environment that supports CAD or CAE applications. Suitable operating system environments include UNIX, Linux, Windows, Macintosh, and DOS.

The host platform 10 also includes input devices such as a keyboard 22 and a pointing device 24, such as a mouse, a touch pad, a track ball, or the like. The host platform 10 also includes an input interface device 26 that is arranged to interface the host platform 10 with other computing platforms, such as a CATIA workstation, and with other sources of input data. The host platform 10 also includes a monitor 28. A system bus 30 interconnects all components of the host platform 10.

The host platform 10 thus includes platforms such as UNIX workstations, personal computers, and Macintosh computers. For example, the exemplary host platform 10 is suitably a UNIX workstation, such as an IBM RS6000 workstation. Because these platforms are well known, further description of their construction and operation is not necessary for an understanding.

Integrated Finite Element Model Generation

According to an embodiment, a process is provided for rapidly generating an integrated finite element model of a component, subassembly, or assembly. The process includes five major modules: (1) input file generation; (2) finite element model generation; (3) model checkout; (4) initial loads and sizing; and (5) integrated finite element model generation. Each of these modules is discussed below in detail.

(1) Input File Generation

The process of generating finite element models is automated through use of standardized input files that are preferably derived from standardized drawing sheets or templates. The purposes of the template include: (1) communicating major elements of design of a component; (2) providing geometry information to create a finite element model; (3) providing all properties, material, and weights information to create a finite element model; (4) defining major structural assemblies; and (5) linking design, stress, loads, weights, and other engineering disciplines when configuring a new structure design.

Figure 2:
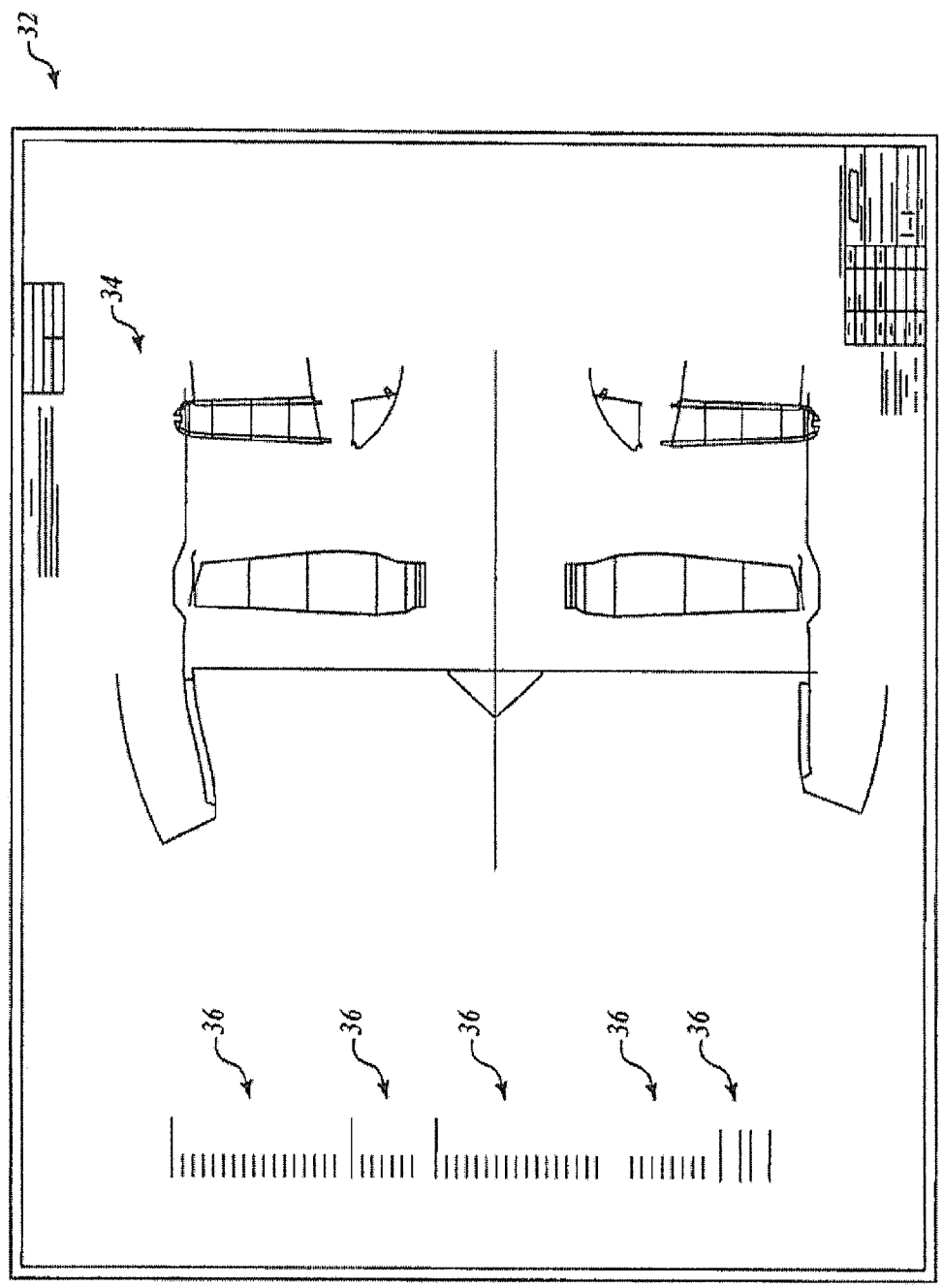
FIG. 2 is a representative drawing sheet template.

FIG. 2 is a representative drawing sheet template 32. The template 32 is a drawing sheet that is designed for modeling. Accordingly, the template 32 includes sufficient line information to define surfaces, structural breaks, properties, material, and mass. The template 32 includes representation of geometry of a component 34. For example, the component 34 shown in the template 32, given by way of non-limiting example, is a nacelle for an aircraft engine. The template 32 also includes information fields 36 that include information for the component 34 regarding geometry, properties, materials, and weights or mass data. Boundary conditions are predetermined.

Figure 3:
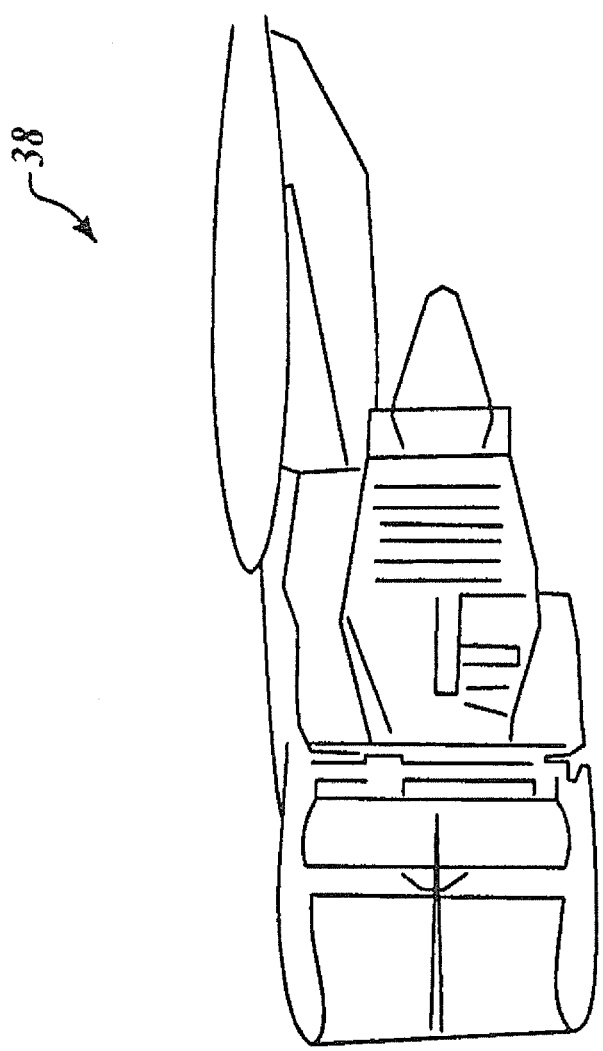
FIG. 3 is a representative two-dimensional centerline diagram.

The template 32 is preferably generated from a two-dimensional centerline diagram 38, a representative example of which is shown in FIG. 3. Given by way of non-limiting example, the two-dimensional diagram 38 shown in FIG. 3 is a two-dimensional preliminary design centerline diagram of an installed nacelle for an aircraft engine. The centerline diagram 38 is suitably generated by an acceptable CAD program, such as, without limitation, CATIA, Unigraphics, or the like. The centerline diagram is transferred to the host platform 10 in computer readable medium such as a CATIA file, Unigraphics file, or the like. Because geometry representing structural configuration of a component begins with the two-dimensional diagram 38, from which the template 32 is preferably generated, it will be appreciated that geometry representing the structural configuration of a component is simplified to points and lines in space. As a result, unlike techniques currently known for defining geometry that represent structural configuration of a component, according to an embodiment input of surfaces to a modeling routine is not required. Instead, the template 32 is developed such that details regarding points and lines in space that are contained within the template 32 are sufficient to communicate a preliminary design of a component. As a result, a subsequently created model will represent the current configuration that is defined on the template 32.

Figure 4:
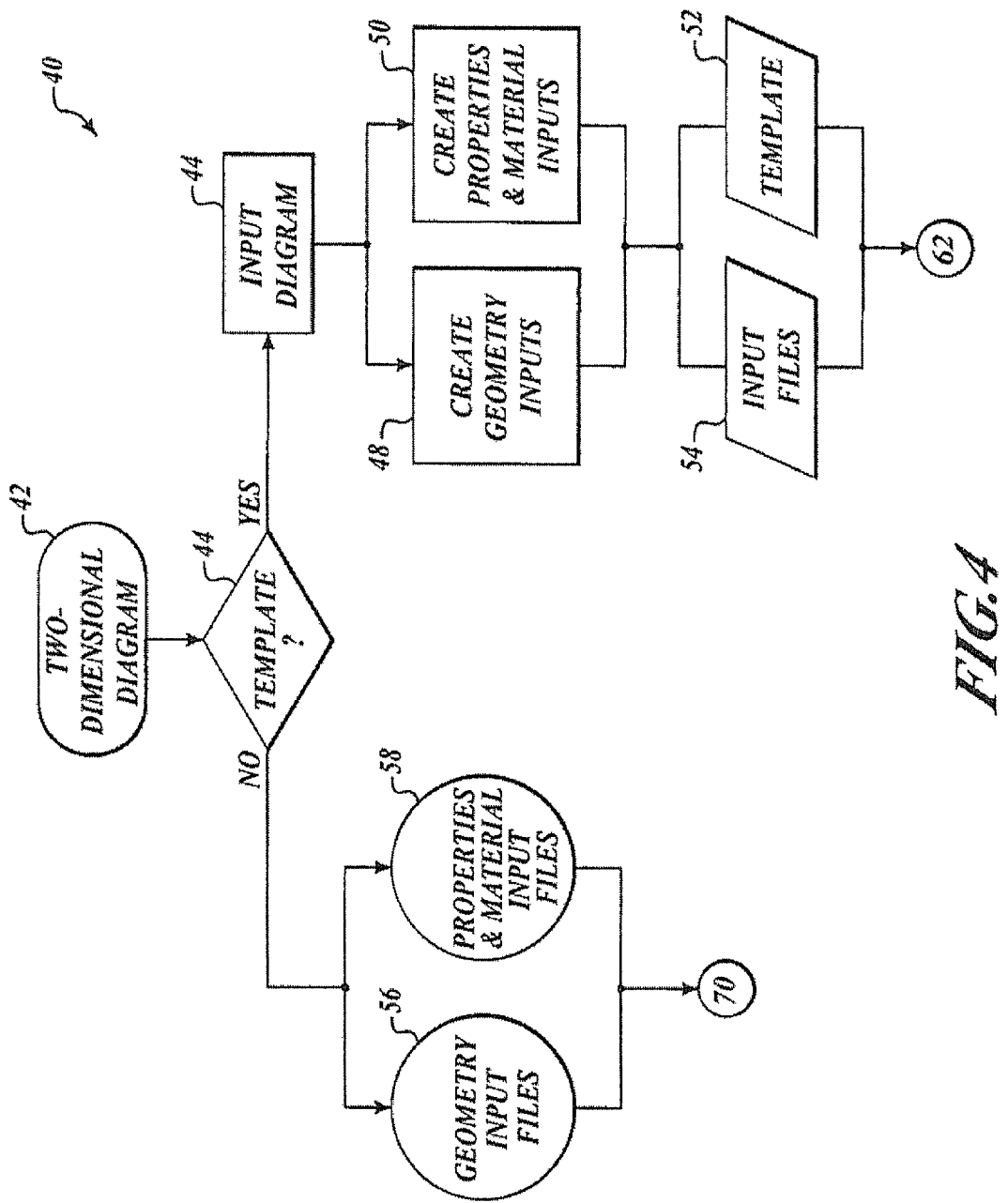
FIG. 4 is a flow chart of a routine for generating geometrical structure inputs and properties and material input.

Generation of the template 32 will now be explained referring to FIG. 4. A routine 40 for generating inputs representing geometrical structure of a component begins at a block 42 with the two-dimensional diagram 38 being provided. According to an embodiment, the standardized input files are preferably generated through generation of the template 32. However, in other embodiments, the standardized input files are generated without use of the template 32—and such generation without use of the template 32 is suitably automated or manual. Accordingly, at a decision block 44, a determination is made whether or not geometrical structure inputs will be created using the template 32 or whether geometrical structure inputs will be manually or automatically created without the template 32.

If a determination is made that the geometrical structure inputs will be created using the template 32, the routine 40 proceeds to a block 46. At the block 46, the two-dimensional diagram 38 is input. For example, in one embodiment, the two-dimensioned diagram 38 is input to the host platform 10 from a CATIA workstation (not shown), via the input interface 26, as a CATIA file. The two-dimensional diagram 38 is preferably read automatically. The host platform 10 reads information regarding points and lines in space defining the geometry of the component 34. For example, an executable file, such as a FURTRAN, C, or PATRAN command language file, can be executed to automatically read information from the file containing the two-dimensional diagram 38. However, it will be appreciated that other command languages in other graphical user interfaces may be used as desired. The block 46 invokes a set of predetermined rules for the component 34. The set of predetermined rules relate property and materials for the component 34 to the geometry of the component 34. For example, if the component 34 geometrically defines ten bays, then the predetermined set of rules requires that the template 32 include ten inputs for property and material definition. However, it will be appreciated that any number of properties and material inputs may be specified as desired for any component. According to an embodiment, the property definition is predetermined for any component, thus automating the properties and material definition for mass and stiffness.

Figure 4A:
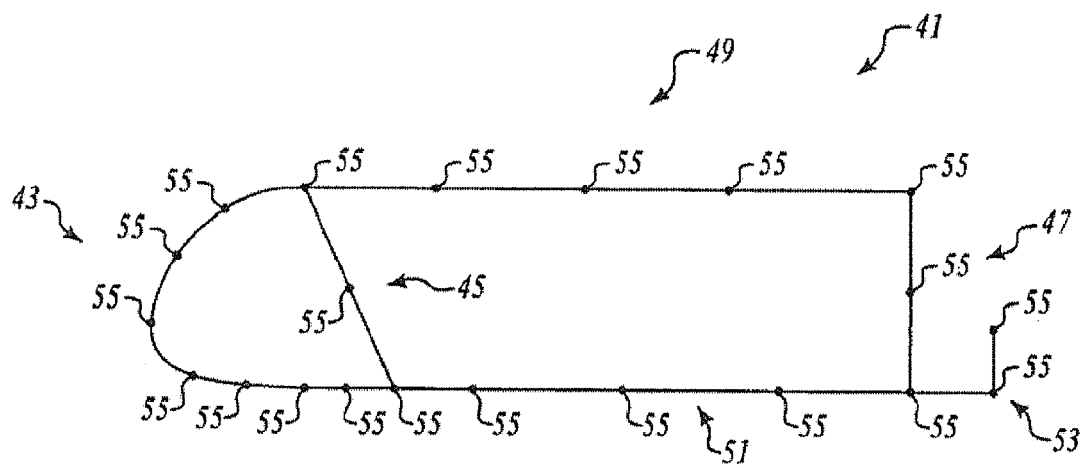
FIG. 4A is a diagram showing geometry definition for a component.

FIG. 4A shows an example of structural definition sufficient to describe surfaces and subassemblies of an inlet 41 for an aircraft engine. The structural subassemblies within the inlet 41 include a lip skin 43, a forward bulkhead 45, an aft bulkhead 47, an outer barrel 49, an inner barrel 51, and an attachment flange 53. All of these structural subassemblies are defined by the plurality of points 55. It will be appreciated that definition of the structure via the plurality of points 55 is sufficient for generating a surface.

Figure 4B:
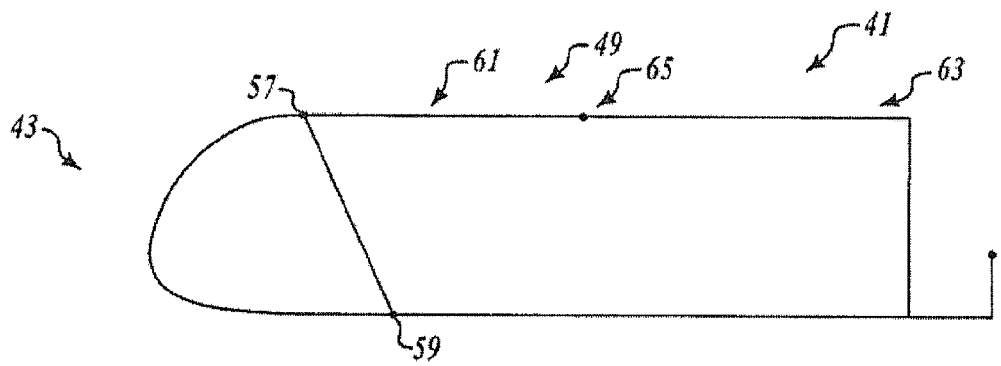
FIG. 4B is a diagram showing properties and material related to geometry of a component.

FIG. 4B shows required input for property breaks related to the structural definition shown in FIG. 4A. As shown in FIG. 4B, the lip skin 43 requires no additional definition for property assignment, because the lip skin 43 is assumed to be monolythic. That is, thickness of the lip skin 43 is assumed to substantially constant between a subassembly break denoted by points 57 and 59 where the lip skin 43, the forward bulkhead 45, the outer barrel 49 and the inner barrel 51 intersect. However, a first property break 61 is defined for the outer barrel 49 between the point 57 and a point 65. The first property break 61 includes a first set of properties and material definitions. A second property break 63 is provided between the points 55 and 59 and includes a second set of property and material definitions. The points 57, 59, and 65 coincide with selected individual points 55 shown in FIG. 4A. As a result, the outer barrel 49 includes multiple property breaks. As a result, the outer barrel 49 includes a section with material and property defined by the property break 61 and another section with properties and materials defined by the property break 63. It will be appreciated that the number of property breaks can be predetermined as desired for any particular component. Thus, the relation of properties and materials to geometrical structure, as shown in FIGS. 4A and 4B, are given by way of non-limiting example only.

Alternatively, in another embodiment, a designer manually reads information from the two-dimensional diagram 38 at the block 46. That is, a designer obtains information regarding points and lines in space that define the geometrical structure of the component 34 from the two-dimensional diagram 38. The designer also manually invokes the set of predetermined rules for the component 34.

The routine 40 proceeds to a block 48, at which geometrical structure of the component 34 is layered. For ease of processing, major structural assemblies of the component 34 are separated by layers. For example, a strut for mounting an aircraft engine is broken into nine major structural assemblies: spars; webs; skins; bulkheads; frames; struts and wing and fitting extensions; hinge fittings; and compression pad fittings. A file in an acceptable language, such as a PATRAN command language file, is suitably executed to layer the geometrical structure of the component 34. The layered geometry suitable resides in a file such as a *.ft1 file.

At a block 50, properties and materials are defined. As previously mentioned, the properties and materials for the component 34 are related to the geometrical structure of the component 34. For example, the number of bays of a component determines the number of inputs for properties and the number of inputs for material definition. At the block 50 the predetermined set of properties and materials rules is applied to the geometrical structure of the component 34. For example, the predetermined set of properties and materials rules may reside in a database that is populated with properties and materials entries for various components. As a result, properties and materials are defined for the component 34. For example, when the component 34 is a strut, the predetermined set of materials rules may predetermine that spars, bulk heads, frames, STW and backup, front weld fittings, hinge fittings, and compression pad fittings are made of metal. However, the predetermined set of materials rules may predetermine that webs and skins may be made of either metal or composite. The predetermined set of materials and properties rules also determines properties for each of the major structural assemblies of the component 34. Functionality of the block 50 is suitably performed by execution of any acceptable file, such as without limitation a PATRAN command language file.

At a block 52, the information fields 36 of the template 32 are populated with information regarding the geometrical structure of the component 34 and with information regarding properties and materials of the component 34, generated as described above at the blocks 48 and 50, respectively. Functionality of the block 52 is suitably performed by execution of any acceptable file, such as without limitation a PATRAN command language file. According to an embodiment, the template 32 is a CAD file, such as without limitation a CATIA file. The template 32, including the information fields 36 and a geometrical representation of the structure of the component 34, thus represents a description of the geometrical structure of the component 34 and the materials and properties of the component 34 in a human-readable form. This permits changes to the geometrical structure of the component 34 or the materials and properties of the component 34 to be entered either manually or automatically later in the design process. Thus, as a CAD file the template 32 can accommodate changes as a design matures or in response to changes in program requirements.

At a block 54, information regarding the geometrical structure of the component 34 is processed into an ASCII input file, such as a *.ft11 file, that is suitable for further processing by a finite element model generation routine. Similarly, information regarding the properties and materials of the component 34 is read from the information fields of the template 32 and is converted into an input file, such as a *.txt file, that is suitable for further processing by a finite element model generation routine. It will be appreciated that the blocks 52 and 54 may be performed simultaneously, if desired, to create the template 32 and the input files.

Referring back to the decision block 44, if a determination is made that a template will not be generated, manual input files are created. At a block 56, an ASCII file is manually created by a designer for geometrical structure input for the component 34. The geometrical structure ASCII input file is suitably a *.ft11 file. Similarly, at a block 58, an input file for properties and material input is created. The properties and material input file is suitably a *.txt file. Manual creation of the geometrical structure input file and the properties and material input file is performed by a designer applying the geometrical structure from the two-dimensional diagram 38 to the predetermined set of properties and materials rules for the component 34. Alternatively, the geometry input file and the properties and material input file can be automatically generated by a suitable CAD software application, such as without limitation ICAD.

The geometrical structure input file and the properties and material input file, regardless of whether the files are generated via creation of the template 32 or are manually or automatically created without the template 32, provide input to the next process according to an embodiment—finite element model generation—from a representation as only points and lines in space. Thus, according to an embodiment, the geometrical structure of the component 34 has been defined without generating any surfaces.

(2) Finite Element Model Generation

Two routines are available for generating a finite element model of the component 34. One routine generates a finite element model when a geometrical structure input file and a materials and properties input file are generated using the template 32. Another routine is available for generating the finite element model when the geometrical structure input file and the properties and materials input file are either manually or automatically generated without the template 32. Each of these routines is discussed below.

Figure 5A:
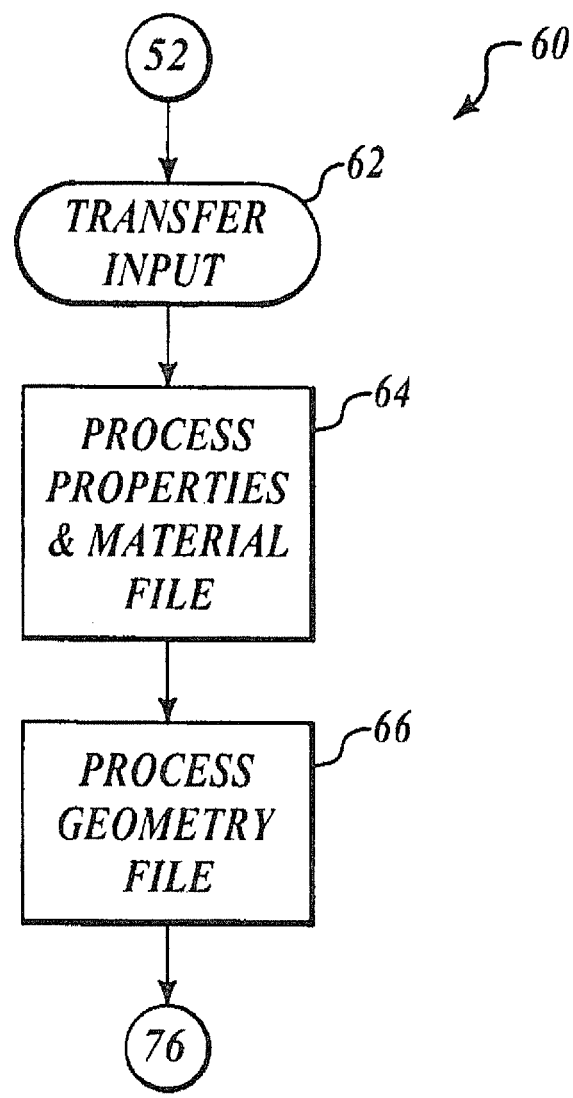
FIGS. 5A, 5B, and 5C are flow charts of routines for generating a finite element model.

FIG. 5A shows a routine 60 for generating a finite element model of the component 34 when the geometrical structure input file and the properties and materials input file are generated from the template 32. That is, referring back to FIG. 4, the input files were generated by performance of blocks 46-54. It will be appreciated that the template 32 is suitably generated in a CAD environment, such as CATIA, Unigraphics, or any other suitable CAD environment known in the art. Generation of finite element models, however, is typically performed in a computing environment other than a CAD environment. For example, finite element models are suitably generated in a UNIX environment. It will be appreciated that embodiments are not limited to UNIX workstations operating in a UNIX environment. As a result, at a block 62 the information from the information fields 36 of the template 32 is input to a suitable environment, such as a UNIX environment, and is transferred to a file that is suitable for processing in that environment. Any computing environment suitable for performing finite element model generation is acceptable and may be employed by embodiments. For example, other suitable computing environments include Windows-based environments and Macintosh environments. In one embodiment, a PATRAN programming code language script is used to transfer data from the template 32, generated on a CATIA workstation, to a UNIX workstation. As a result, identified geometry is now in a suitable format for further processing by the host platform 10 to generate a finite element model.

At a block 64 the properties and material input file is automatically processed. A suitable file, such as a series of FORTRAN executable files, is executed at the block 64. At the block 64, the properties and material file, such as a *.txt file, is read and is automatically processed into a suitable file, such as a *.prop file, that can be accessed for a MSC/NASTRAN bulkdata deck for a finite element model.

At a block 66, surfaces of a finite element model of the component 34 are generated. At the block 66, an executable file, such as an executable PATRAN file or FORTRAN executable file or the like, automatically creates nodes and elements that mathematically define structure of the component 34 based on the geometrical input file, such as a *.ft11 file. Executable files for generating surfaces, that is nodes and elements that mathematically define structure, are well known in the art. An explanation of such an executable files is not necessary for an understanding. It will be appreciated that the blocks 64 and 66 may be performed simultaneously, if desired.

Figure 5B:
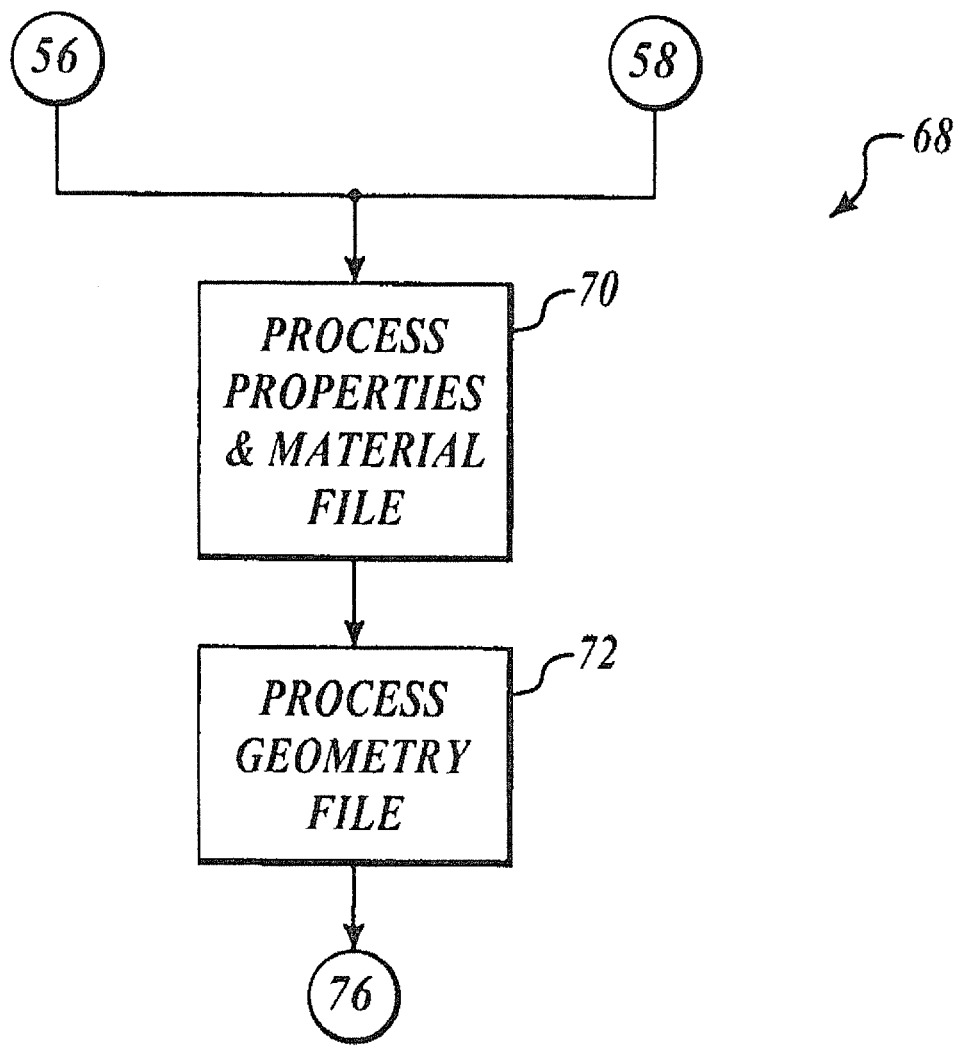

FIG. 5B shows a routine 68 for generating a finite element model for a component 34 when the geometry input file and the properties and material input file have been created without use of the template 32. That is, the geometry input file and the materials and property input file were created either manually or automatically in a CAD environment such as, without limitation, ICAD. The routine 68 is adapted for an automated process. As such, the routine 68 is well adapted for sizing iterations described later. From the blocks 56 and 58 (FIG. 4), the routine 68 proceeds to a block 70 at which the properties and material input file is processed. Processing performed at the block 70 is the same processing previously described for the block 64 (FIG. 5A).

At a block 72, surfaces for the finite element model are generated through creation of nodes and elements that mathematically define the structure of the component 34 based on the geometry input file. Processing performed at the block 72 is the same processing previously described for the block 66 (FIG. 5A).

In addition to being generated in a significantly faster time than is possible using currently known finite element modeling techniques that require input of previously-generated surfaces, finite element models generated according to embodiments include highly accurate surfaces. For example, parametric measurements of surfaces generated according to an embodiment indicate that surface accuracy of greater than 99 percent has been achieved. This is significant because the geometric requirements for generating a finite element model have been simplified to geometric structure represented by points and lines in space that are readily available and created early in design process of a component.

However, as design detail develops greater definition, greater accuracy may be desired or required. In such instances, it may be desirable to adjust surfaces of the finite element model using additional information that becomes available. Because the finite element model has been generated according to an embodiment significantly earlier in the design process than is possible with currently known finite element model generation methods, refined design data for complex components or user-defined data for components may not be available. However, more information about design of a component may become available as design of the component matures or as the design process continues. An embodiment provides a method for updating or refining surfaces of the finite element model when additional information becomes available.

Figure 5C:
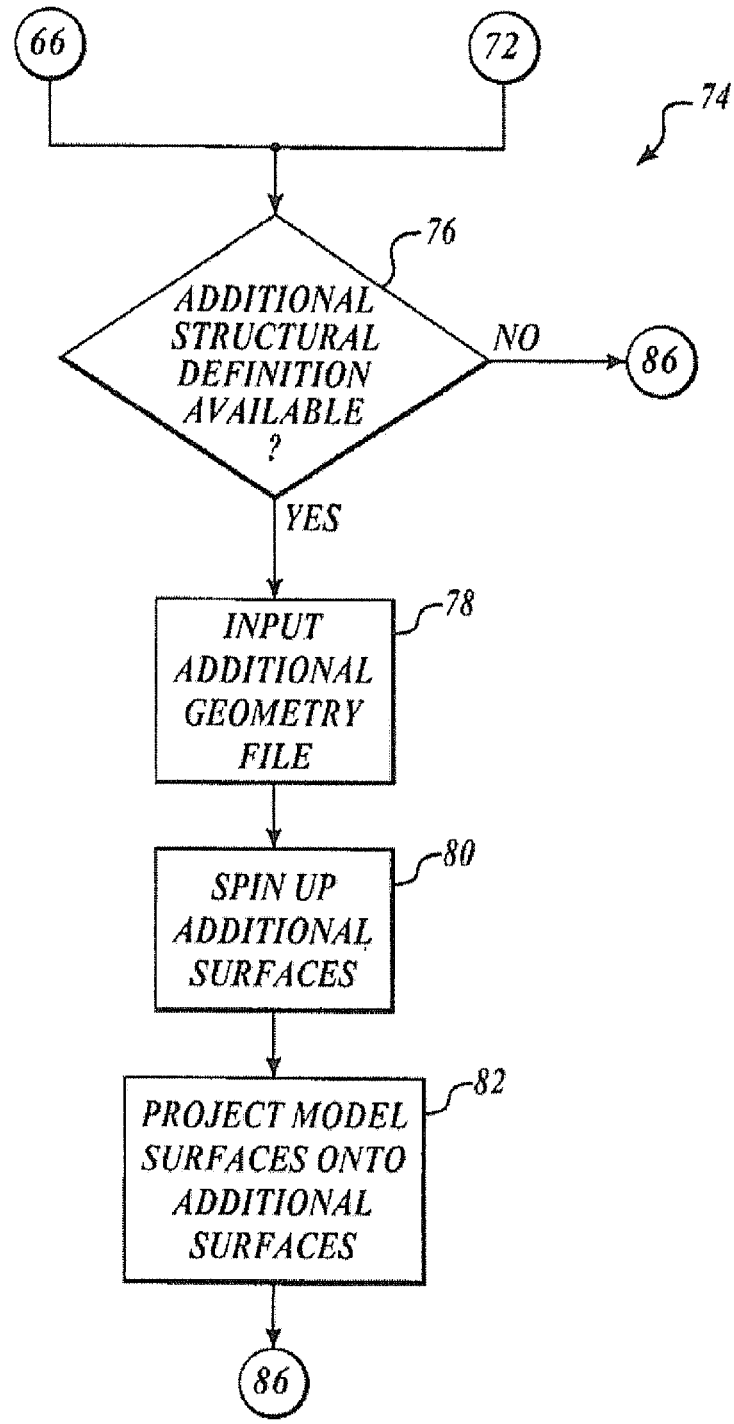

FIG. 5C shows a routine 74 for projecting surfaces of a finite element model that has been generated according to an embodiment. At a decision block 76, a determination is made whether or not additional structural definition of geometry of the component 34 in the form of points and lines in space is available. When a determination is made that no such additional information is available, the routine 74 proceeds without further processing. When a determination is made that further data representing points and lines in space are available for defining the geometrical structure of the component 34, the routine 74 proceeds to a block 78. At the block 78, additional information regarding geometrical structure of the component 32 in the form of points and lines in space is input as an appropriate additional geometry input file, such as a *.ft11 file. At a block 80, a surface is spun up from the points and lines in space contained in the additional geometry input file using known techniques, such as a PATRAN or FORTRAN executable file. At a block 82, surfaces generated in the form of points at the blocks 66 and 72 are projected onto the new surface definition generated at the block 80. The points inside the model are updated to represent the change.

The blocks 66, 72, and 82 use a structured number system for grids, elements, properties, and materials. The number system assigns a predetermined range of numbers for subassemblies, properties, materials, and boundaries. The numbering system also applies to individual model numbers, super element definition, and boundary grids and elements. The structured numbering system automates and simplifies further processing of the finite element models. As a result of a structured numbering system, model generation is repeatable and predictable. Models are automatically broken into groups by structural assembly, allowing for quick review, processing, and evaluation. The structured numbering system preassigns interface boundaries between models of components, thus automating integration of models of components into models of assemblies. The structured numbering system further automates breakdown and modification of weights, and allows for complex internal loads processing for automated sizing.

Now that a finite element model for the component 34 has been generated, further checkout of the model, analysis of the model, and integration of the model of the component 34 into a model of an assembly may be performed as desired. These additional processes are discussed below.

(3) Model Checkout

Figure 6:
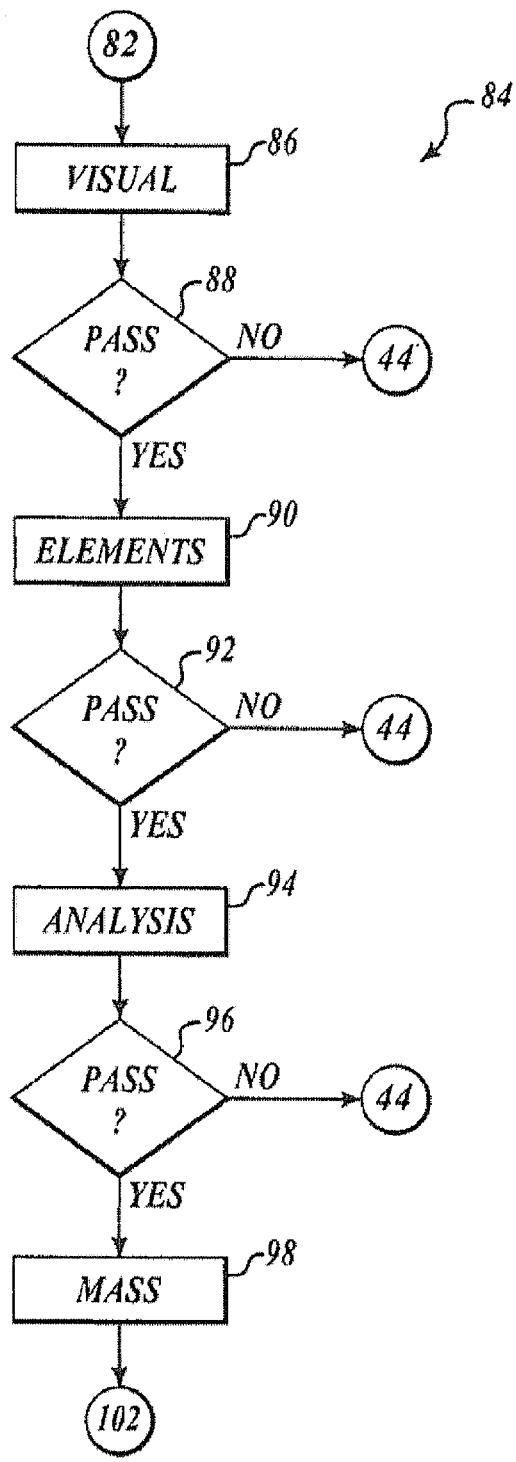
FIG. 6 is a flow chart of a routine for performing checkout and analysis of a finite element model.

FIG. 6 shows a routine 84 for analysis checkout of a finite element model. Analysis checkout is conducted on the model of the component 34 to ensure the model is free of errors prior to release of the model. The routine 84 performs four checks: (1) visual; (2) elements; (3) analysis; and (4) mass. It will be appreciated, however, that further analysis of the model may be performed as desired.

At a block 86, a visual analysis is performed by the modeler. The model of the component 34 is automatically grouped into its constituent components for visual inspection. The visual inspection performed at the block 86 includes checks for consistency of surface normalcy, consistency of element coordinate systems, beam orientation, and offsets and pin flag.

At a decision block 88, a determination is made whether the visual analysis has been passed successfully. If the visual analysis is not passed, the routine 84 returns to the block 44 for further refinement of the geometrical structure of the component 34.

If the visual analysis is passed as determined at the decision block 88, then at a block 90 an elements analysis is performed. The elements analysis can include an analysis run of skew angle, aspect ratio, wrap, and Jacobian ratio. The block 90 performs gravity runs for the elements analysis. The block 90 is suitably performed by MSC/NASTRAN.

At a decision block 92, a determination is made whether the model of the component 34 passes the elements analysis. If the elements analysis is not passed, then the routine 84 returns to the decision block 44.

If the elements analysis is passed, the routine 84 proceeds to a block 94. At the block 94, analysis is performed on the model of the component 34. A stiffness-deflection check is performed, such as Epsilon value and maximum diagonal ratio. A load balance and boundary conditions check is performed. Also, an Eigen value solution is obtained for rigid body modes with no constraints, and frequency is evaluated. The block 94 is suitably performed by MSC/NASTRAN.

At a decision block 96, a determination is made whether the analysis at the block 94 has been passed. If the analysis is not passed, the routine 84 returns to the decision block 44.

If a determination is made at the decision block 96 that the analysis is passed, the routine 84 proceeds to a block 98 at which a mass analysis is performed. The mass analysis includes a weight summary of the structure generated based on predetermined subassemblies to determine and adjust mass of the component, such as frames, bulkheads, chords, and the like. The mass analysis also generates a table of differences between weight of the model of the component 34 and weight of an actual physical component. The mass analysis also generates a table of differences between center of gravity, if applicable, between a model of the component 32 and an actual physical component. Also, a gravity card is updated to ensure accuracy of weight and center of gravity, if applicable.

Now that a checkout and analysis of the model has been performed, an embodiment provides for initial loads and sizing of the component model.

(4) Initial Loads and Sizing

Figure 7:
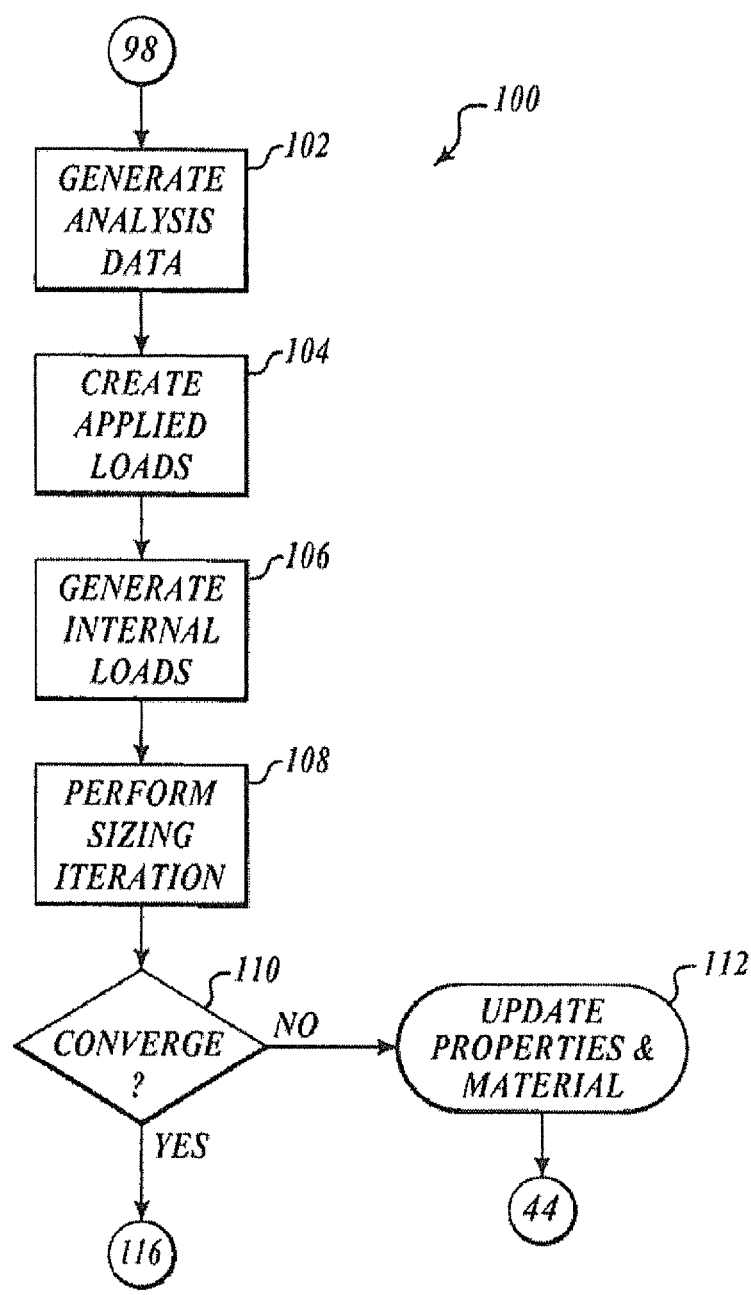
FIG. 7 is a flow chart of a routine for generating initial loads and sizing of a finite element model.

FIG. 7 shows a routine 100 for performing initial loads and sizing of a finite element model of the component 34. The routine 100 uses a predetermined number of select, simplified loads cases to ensure proper mass and stiffness representation of the component 34. The routine 100 entails two major processes: (1) defining load sets; and (2) refining sizing of the component 34 using the defined load sets. The routine 100: provides increased confidence in initial design layouts; speeds up the preliminary design process; generates a set of preliminary design loads prior to 25% drawing release; and reduces risks and avoids costs associated with retooling and redesign.

At a block 102, an analysis deck, such as a MSC/NASTRAN bulkdata deck, is generated from the geometrical input file, such as a *.ft11 file, and the properties and materials input file, such as a *.txt file. The analysis deck data has been checked out previously by the routine 84.

At a block 104, a set of applied loads for the component 34 is produced. Because the set of applied loads is produced for initial sizing, it will be appreciated that the set of applied loads produced at the block 104 is a reduced set of loads, such as ultimate and damage-tolerance loads. Representative applied loads produced at the block 104 include, without limitation, gravitational (g) loads, pressure, thermal, sonic, and other typical parameters associated with the component 34. A suitable file, such as a FORTRAN executable file, is executed at the block 104 to produce the set of applied loads.

At a block 106, a set of internal loads is generated. Exemplary internal loads generated include internal forces, stress, and strain. According to an embodiment, generation of internal loads is standardized according to the numbering system. As a result of such standardizing, generation of loads becomes automated. A suitable file, such as an executable FORTRAN file, or a MSC/NASTRAN file, is executed at the block 106 to produce the set of internal loads.

At a block 108, sizing iteration is performed. The block 108 inputs the set of applied loads from the block 104 and the internal loads from the block 106 and iterates sizing of the component to ensure proper mass and stiffness representation of the component 34. A suitable file, such as an executable FORTRAN file, is executed at the block 108 to perform the sizing iteration.

At a decision block 110, a determination is made whether or not sizing, that is stiffness representation, converges upon predetermined criteria for the set of applied loads generated at the block 104 and the set of internal loads generated at the block 106. The predetermined convergence criteria is suitably a predetermined percent change in stiffness between successive sizing iterations. Given by way of non-limiting example, a suitable set of predetermined convergence criteria includes a five (5) percent change in mass or difference between successive sizing iterations. However, any convergence criteria may be used as desired.

If a determination is made that the predetermined convergence criteria is not met, the routine 100 proceeds to a block 112. At the block 112, the properties and materials input file, such as a *.txt file, is updated with sizing information from the block 108. From the block 112, the routine 100 returns to the routine 40 at the block 44 for generation of another iteration of a finite element model of the component 34. According to an embodiment, the routine 100 is repeated, and a determination is repeated at the decision block 110 regarding successive iterations. It will be appreciated that the first time the routine 100 is performed, only one iteration is available for the decision block 110. So, the first time the routine 100 is performed, the routine 100 will perform the block 112.

If a determination is made at the decision block 110 that the predetermined convergence criteria is met, the routine 100 ends. The finite element model of the component 34 has been generated, checked out, and initially sized. Next, the finite element models of a plurality of components may be integrated, if desired.

(5) Integrated Finite Element Model Generation

Figure 8:
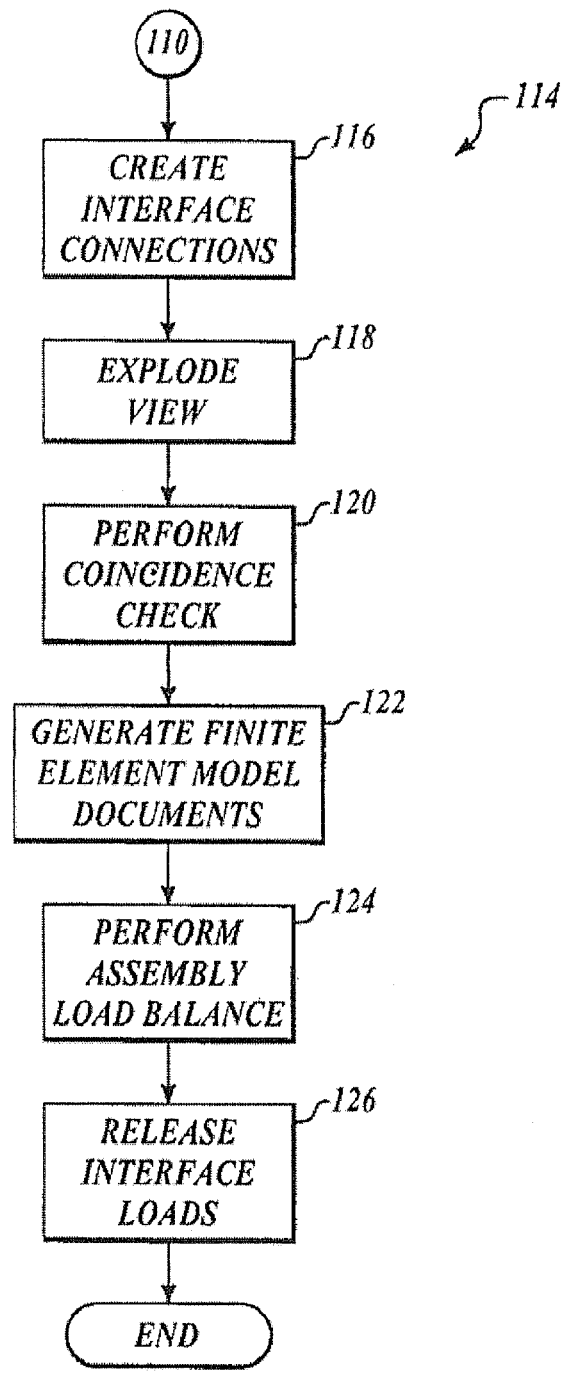
FIG. 8 is a flow chart of a routine for integrating finite element models.

FIG. 8 shows a routine 114 for integrating finite element models of individual components, such as the component 34 and other components, into an integrated finite element model. At a block 116 interface connections between models of components to be integrated are created. Because embodiments provide a predetermined numbering system, creation of the interface connections is automated. The predetermined numbering system provides grids for the components to be modeled, and the interface connections are generated at the predetermined grid locations representing predetermined connection points for the components that are interfaced.

At a block 118, an exploded view of the integrated model is generated. Each component model remains intact, but the components that are to be integrated may be spaced apart from each other in the exploded view for visual clarity.

At a block 120, a coincidence check of the integrated model is performed at major interfaces of the components to be integrated. The block 120 ensures that the components to be integrated are connected together properly.

At a block 122, finite element model documentation is generated. The documentation suitably includes reports on integration of the various components.

At a block 124, a load balance is performed for the integrated finite element model. The load balance ensures that loads in equal loads out.

At a block 126, interface loads are released, and the routine 114 ends.

Example of Model Generation

A non-limiting example of finite element model generation, given by way of example only, will now be described. Screen shots within an exemplary, non-limiting graphical user interface (GUI) used in an embodiment will be referred to in the following description. For example, the following screen shots were generated within a PATRAN GUI, available from MacNeil Schwendler Corporation, running on an IBM RS6000 UNIX workstation. It will be appreciated that use of a GUI renders unnecessary tedious typing, such as that required for creating numerous UNIX commands to invoke sequences of UNIX scripts and for executing FORTRAN programs. However, it will be appreciated that one skilled in the art will be able to create, without undue experimentation, appropriate files outside of a GUI, such as UNIX files or FORTRAN programs, to perform functionality set forth herein.

Figure 9A:
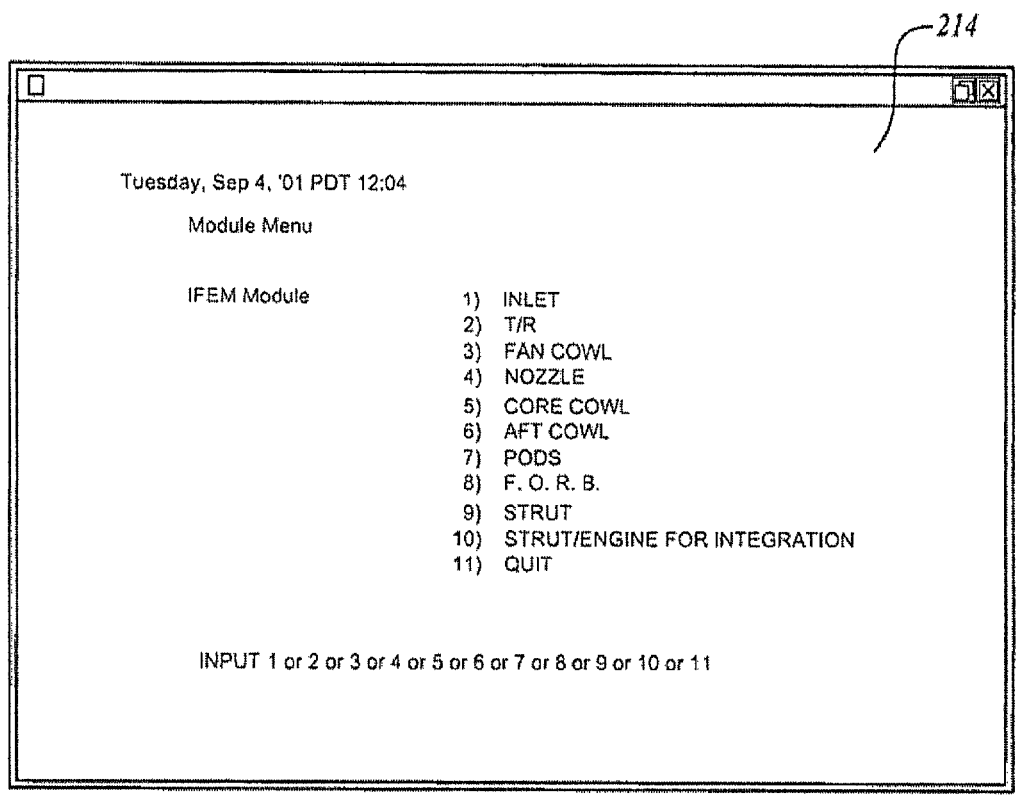
FIGS. 9A-9N are screen shots of an example of finite element model generation according to an embodiment.

FIG. 9A shows a screen shot of an initial screen 214 at which a selection is made for a type of component that is to be modeled. In this non-limiting example, a strut is selected by inputting the number 9. Selecting a strut invokes the set of predetermined properties and materials rules that define preliminary properties and materials for a strut. If desired, further definition of the component may be selected, as desired. For example, a strut may be further defined as fan or core-mounted.

Figure 9B:
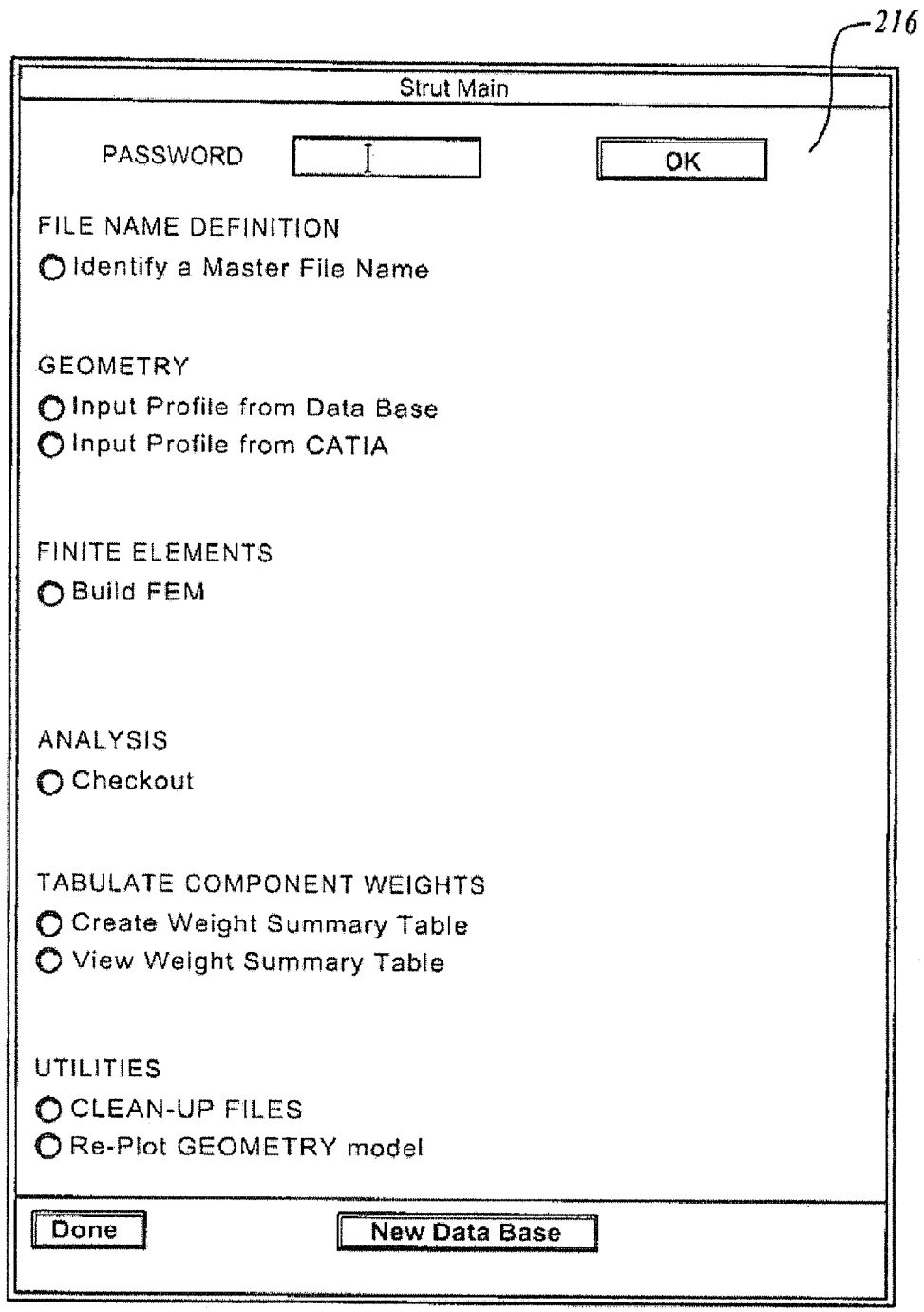

Once the user has selected the component to be modeled, a GUI is instantiated. For example, FIG. 9B shows an initial screen 216 generated in a PATRAN GUI. It will be appreciated that the GUI can take any form, as desired for a particular application. As is known, logic can be coded into a PATRAN GUI in PATRAN Command Language (PCL). As is also known, a PCL file is executed when PATRAN is used. The GUI includes a plurality of buttons. Each button, when selected, invokes a process. The process selected by the button suitably invokes a PATRAN PCL file, a UNIX file, a series of FORTRAN or C executables, or the like.

Figure 9C:
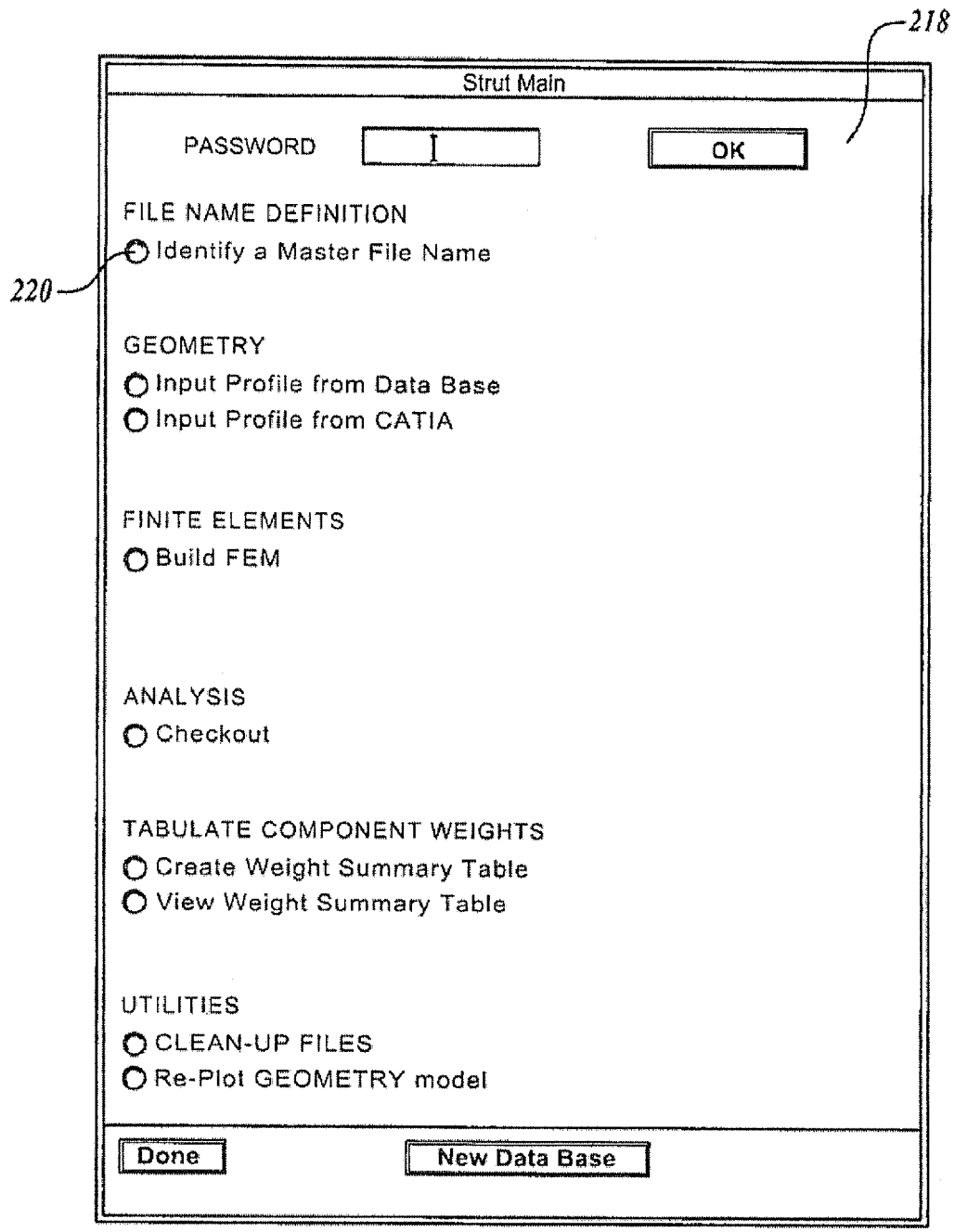
Figure 9D:
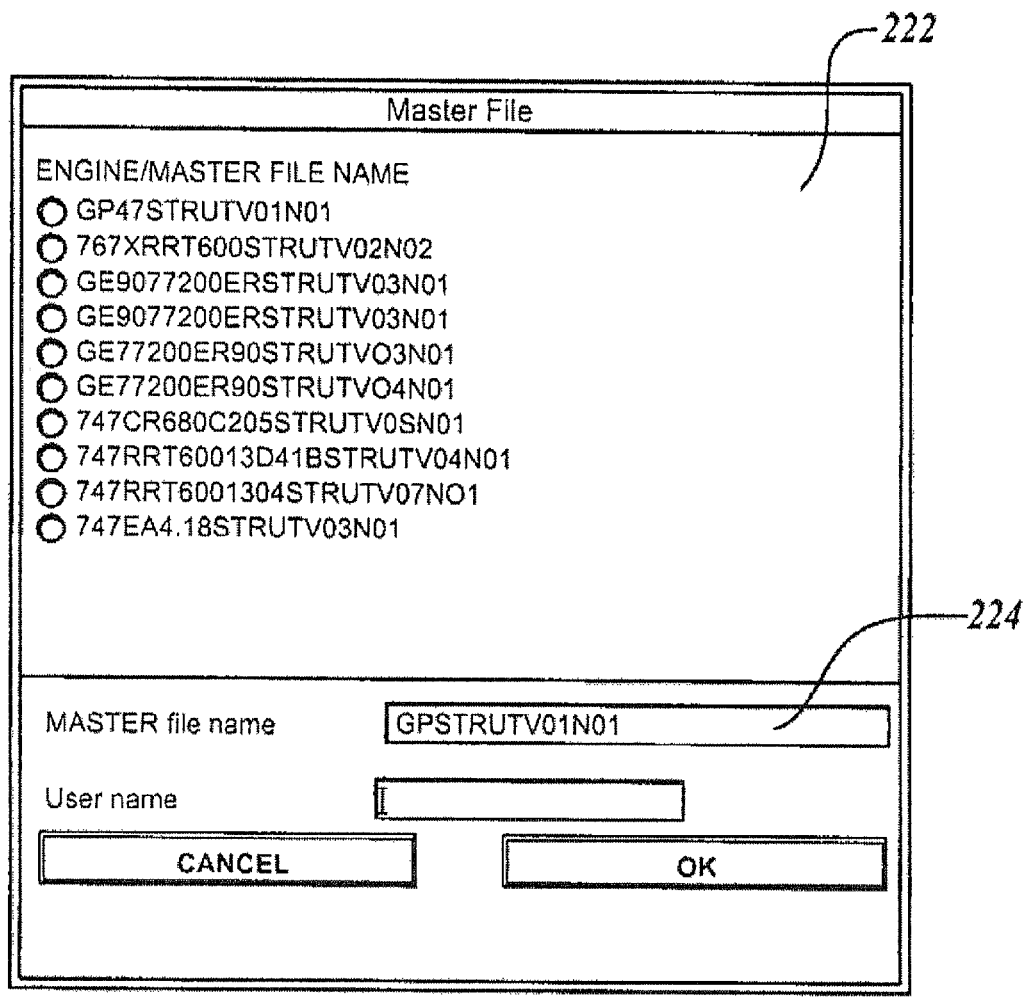

FIG. 9C shows a screen 218 at which a button 220 is selected for identifying a master file name. Referring now to FIGS. 9C and 9D, in response to selection of the button 220, a screen 222 is generated at which the user identifies the master file name in a field 224. The files can be input from various sources, such as for example, CATIA; a database of pre-defined geometrical structure input files and properties and material input files; or a user-defined working directory. For example, inputting files from a user-defined working directory permits inputting the geometry input file and the properties and material input file from any source. As described above, the files in the user-defined working directory are suitably generated either manually or automatically in a CAD environment, such as ICAD.

Figure 9E:
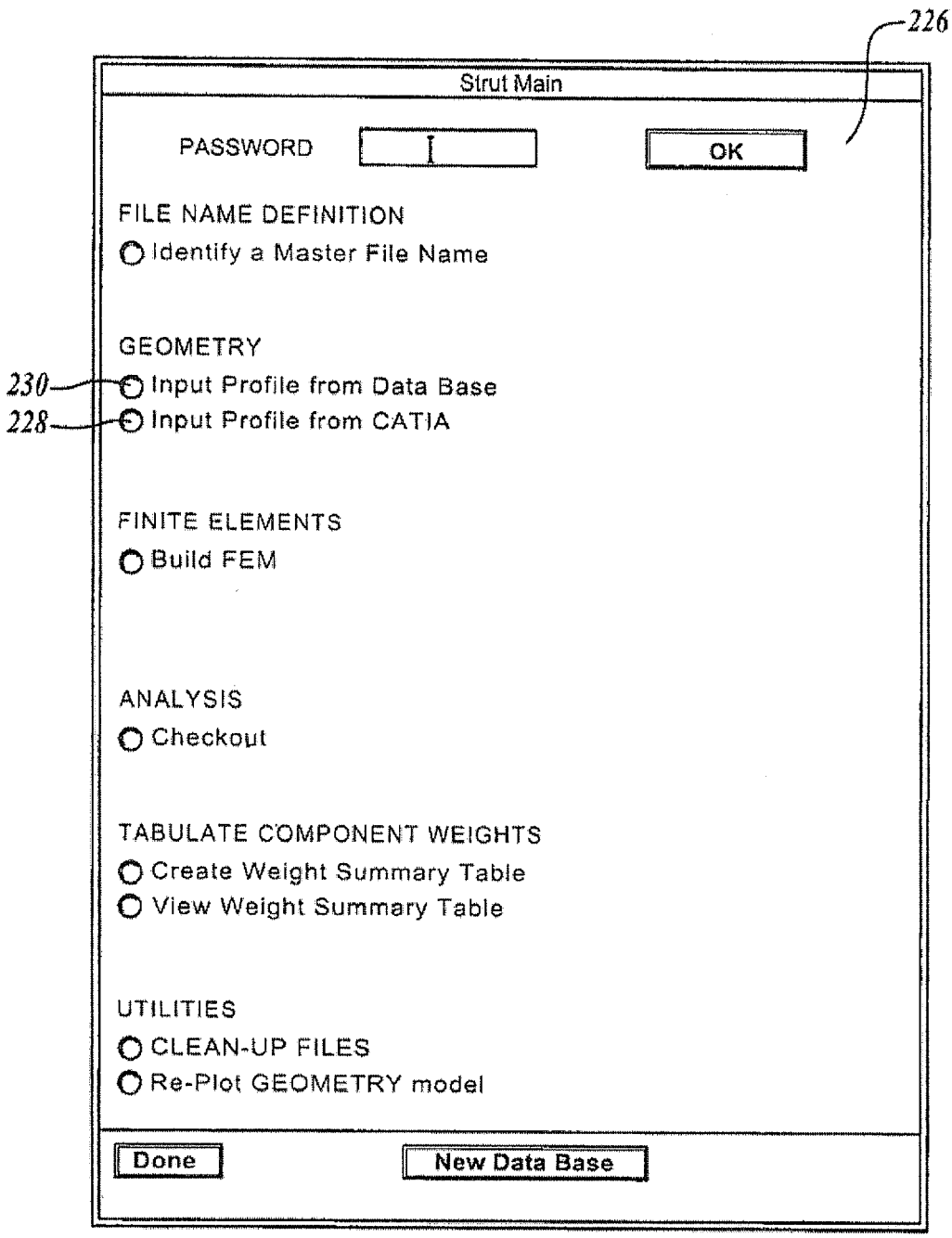

FIG. 9E shows a screen 226 at which a user selects a button 228 to input the two-dimensional diagram 38 in a suitable format, such as a CATIA file. Alternately, a user selects a button 230 to input a geometry input file in a suitable form, such as an ASCII file, from a database.

Figure 9F:
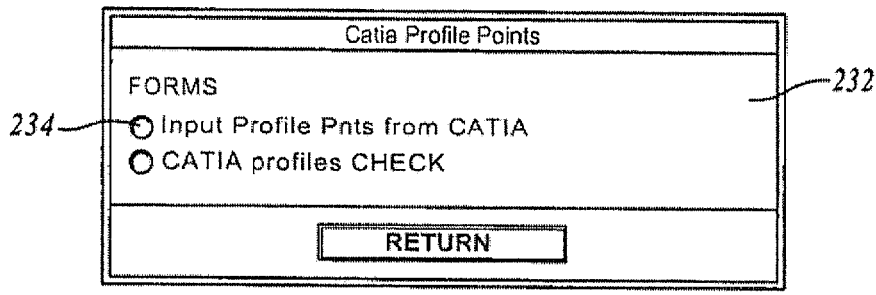

Referring now to FIGS. 9E and 9F, a screen 232 is generated in response to selection of the button 228. Selection of a button 234 invokes the routine 40 for extracting data from the template 32.

Figure 9G:
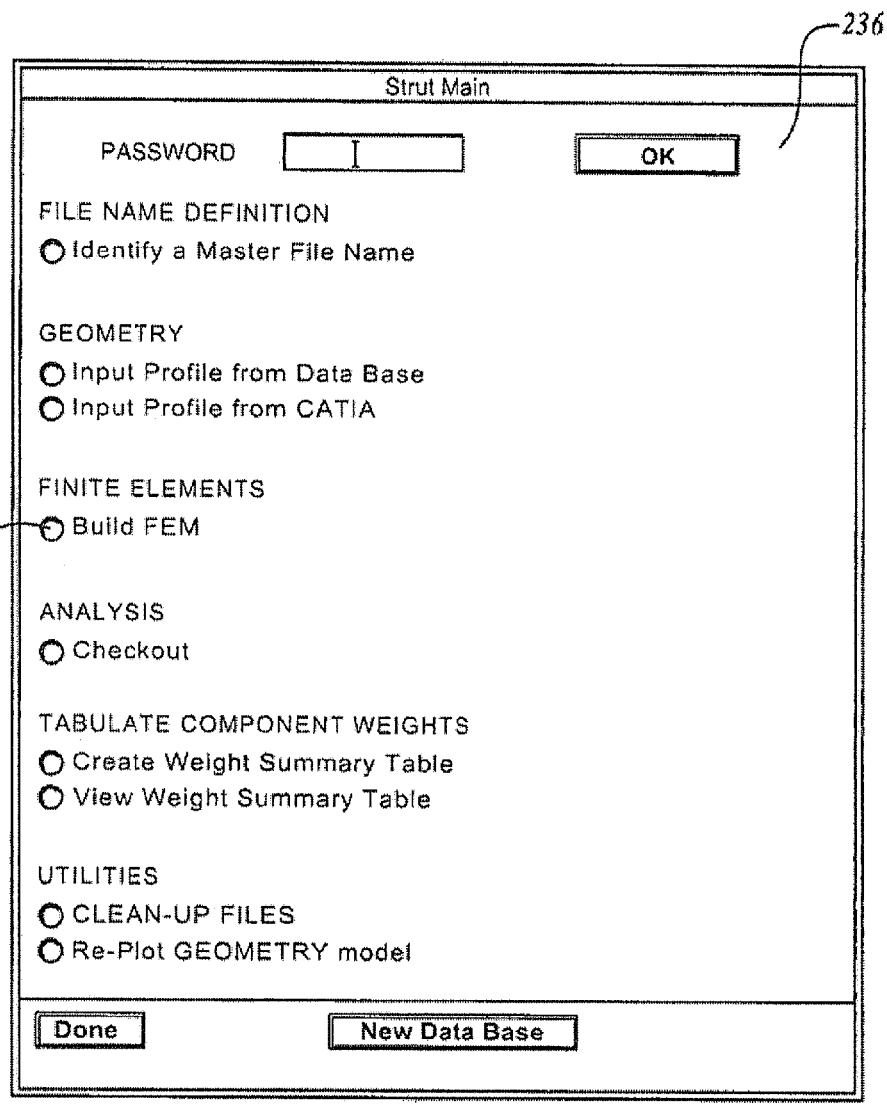

FIG. 9G shows a screen 236 at which a user selects a button 238 to generate a finite element model of the component 32. In response to selection of the button 238, PATRAN instantiates a suitable executable code, such as a UNIX file, a series of FORTRAN executables, and a PCL file, to generate the model. Selection of the button 238 invokes the routine 60 (FIG. 5A) when the button 228 (FIG. 9E) is selected. Alternately, selection of the button 238 invokes the routine 68 (FIG. 5B) when the button 230 (FIG. 9E) is selected.

Figure 9H:
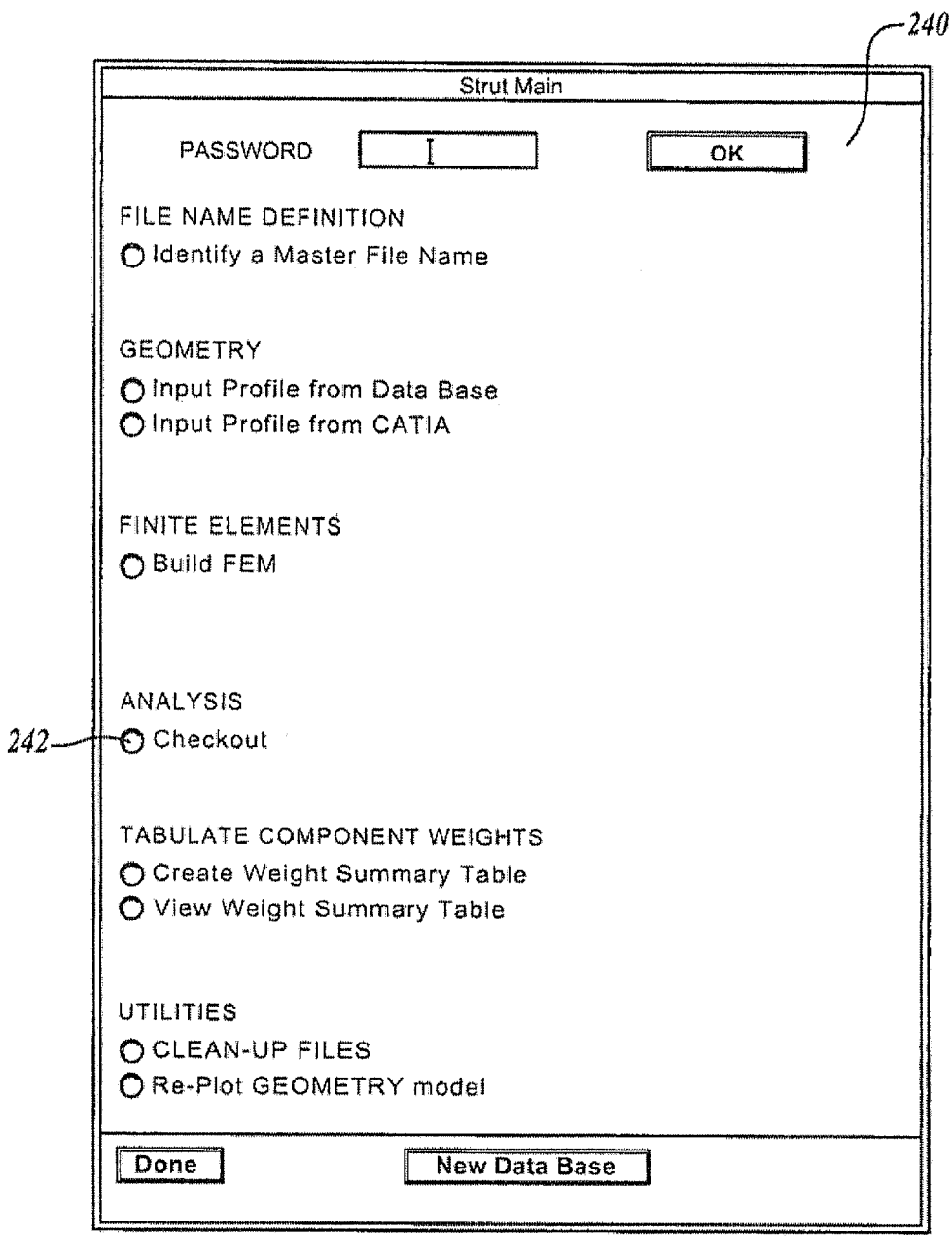
Figure 9I:
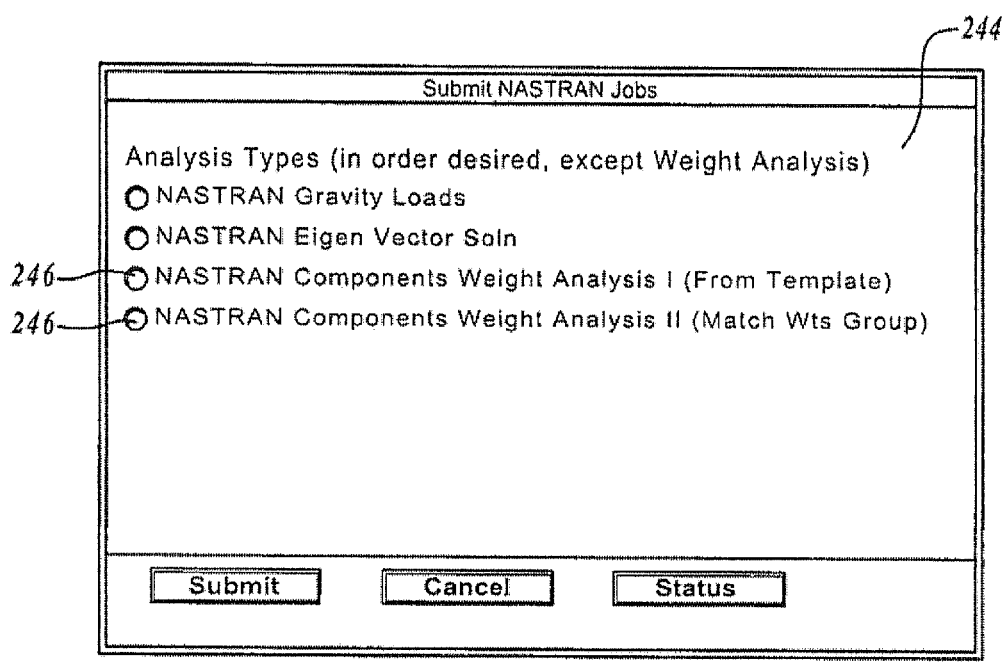

FIG. 9H shows a screen 240 at which a button 242 is selected, if desired, to perform checkout analysis. Selection of the button 242 invokes the routine 84 (FIG. 6). It will be appreciated that, for a dynamic analysis, proper mass must be assigned in addition to proper stiffness representation. Accordingly, as shown in FIG. 9I, a screen 244 includes buttons 246 for selecting a process for checking and adjusting weights.

Figure 9J:
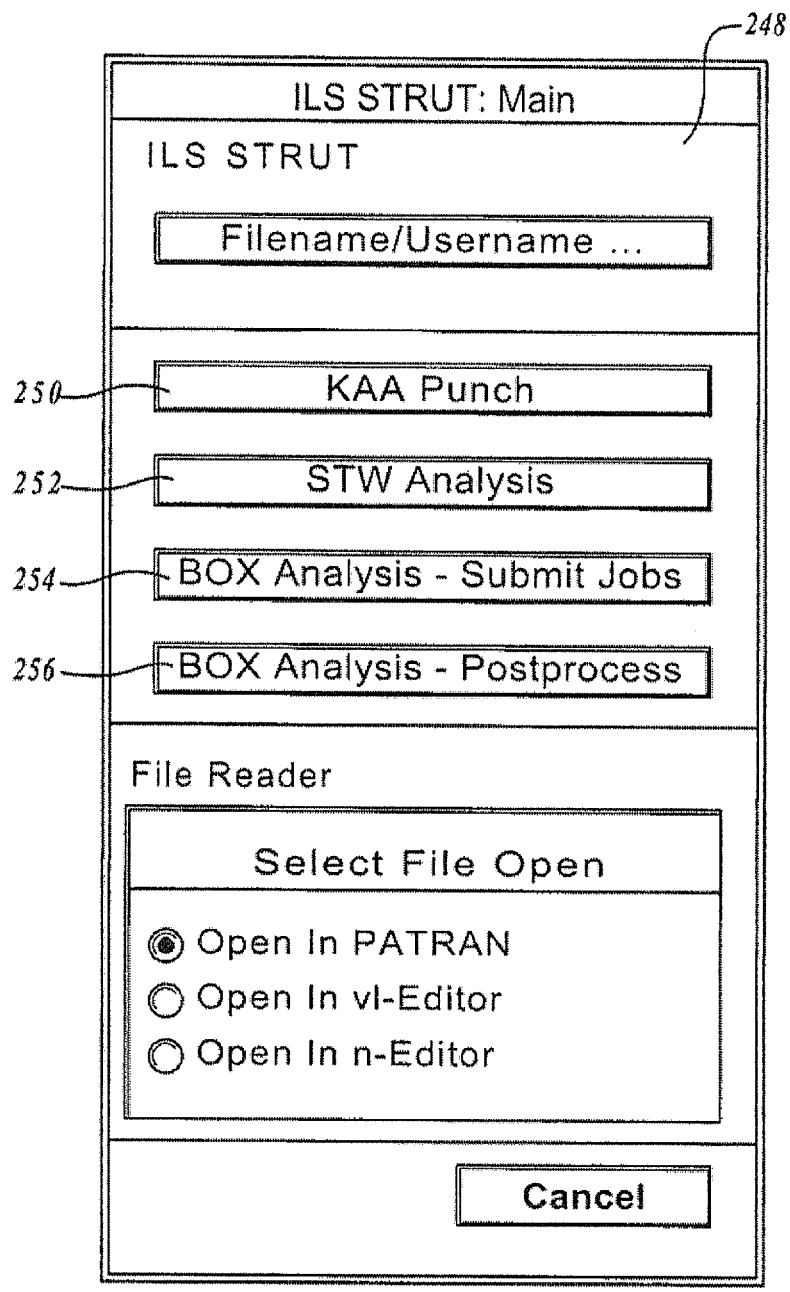

FIG. 9J shows a screen 248 at which a user selects processes for invoking the routine 100 (FIG. 7) for initial loads and sizing. A button 250 is selected to generate a stiffness matrix. A button 252 is selected to perform an analysis for ultimate and damage tolerance loads. A button 254 is selected to perform an analysis of whether or not box structures are intact or have failed. A button 256 is selected to perform post-processing of selected box structure that is either intact or has failed, if desired.

Figure 9K:
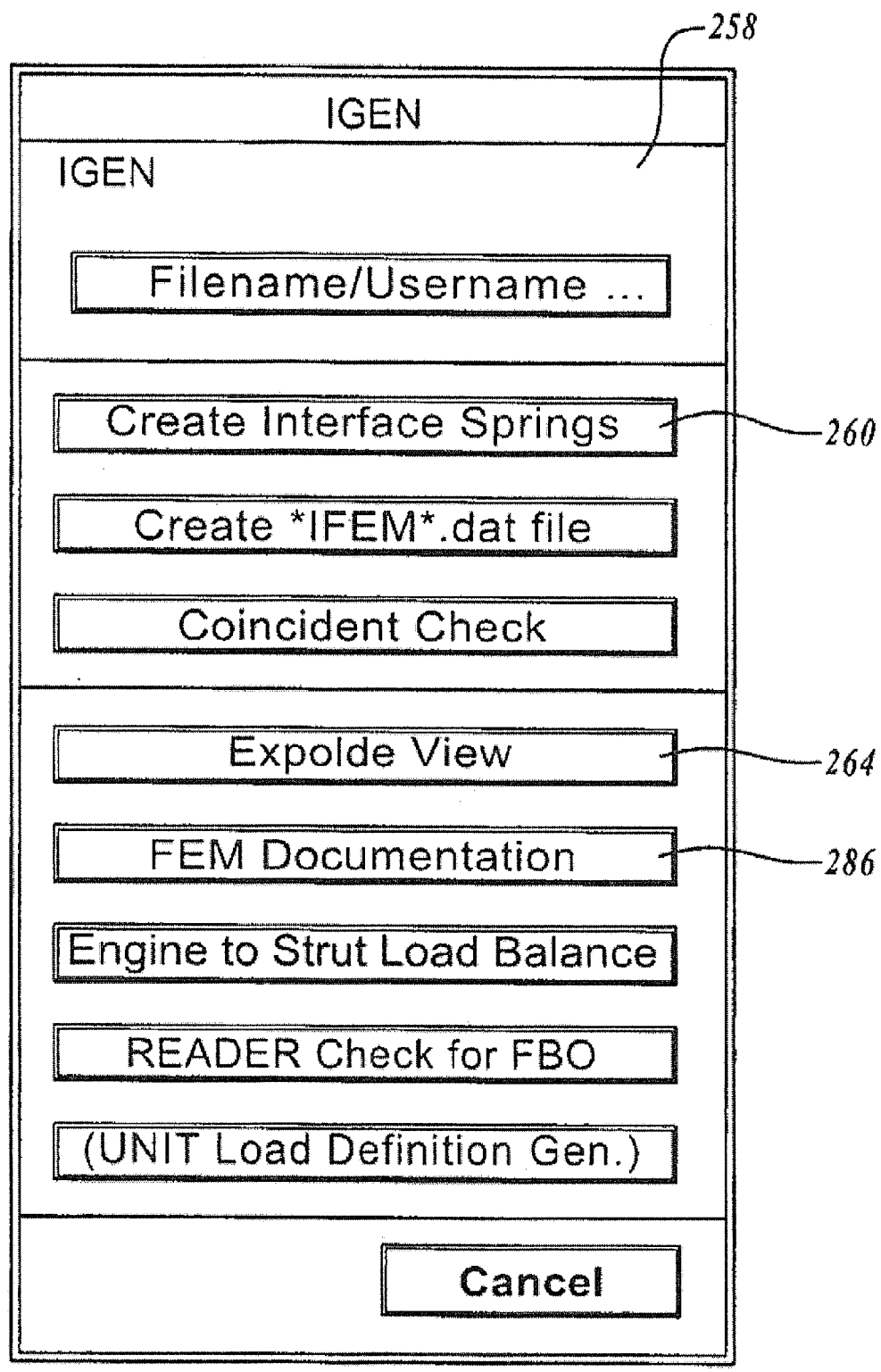

FIG. 9K shows a screen 258 at which a user selects processes for performing integrated finite element model generation. A button 260 is selected for creating interface connections. In response to selection of the button 260, a screen 262 (FIG. 9L) is generated. The screen 262 shows descriptions of the interfaces generated at the block 116 (FIG. 8).

Figure 9M:
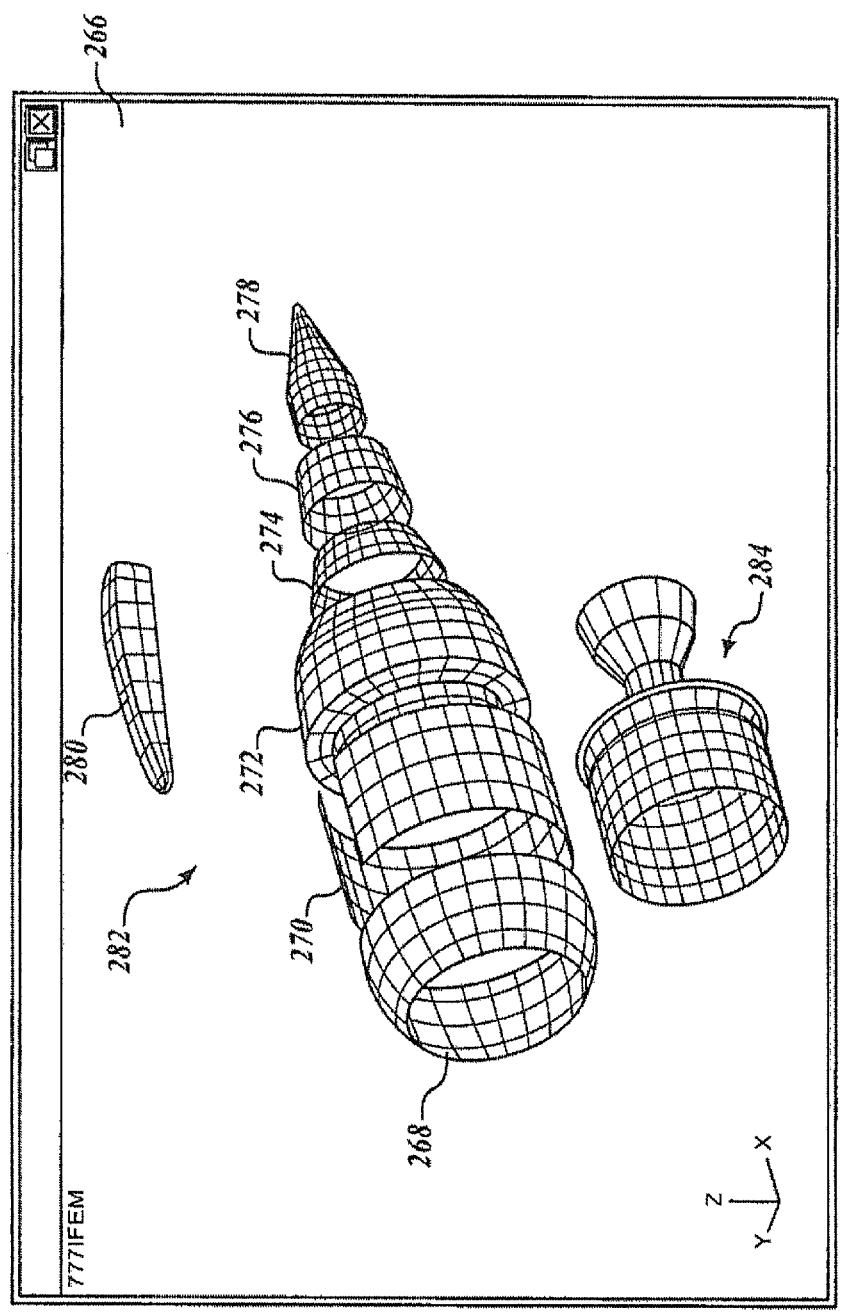

Referring back to FIG. 9K, a button 264 is selected to generate an exploded view of the integrated finite element model. FIG. 9M shows a screen 266 that includes an exploded view of an integrated finite element model. For example, the screen 266 shows an exploded view of models of an inlet 268, a fan cowl 270, a thrust reverser 272, an aft cowl 274, a nozzle 276, a plug 278, a strut 280, a fan cowl support beam 282, and an engine 284.

Referring back to FIG. 9K, a button 286 is selected to generate finite element model documentation. Selection of the button 286 invokes the block 122 (FIG. 8), and results in a screen 288 (FIG. 9N).

Exemplary Embodiments for Automatically Processing Geometry Data

Other embodiments provide additional automated methods, system, and computer program products related to geometry data. For example, according to other embodiments geometry data automatically can be extracted from a drawing file by an interface application. Also, geometry data, that may be generated from any suitable source and/or that may have already been extracted from a drawing file, automatically can be read by an interface application. Reading the geometry data can thus permit changes to be made to the geometry data or an existing drawing file to be revised or an active drawing file created, thereby "closing the loop" regarding extracted geometry data. Extracted geometry data also permits other embodiments to simultaneously access and process multiple sets of extracted geometry data, thereby simultaneously automatically generating multiple finite element models.

Figure 10:
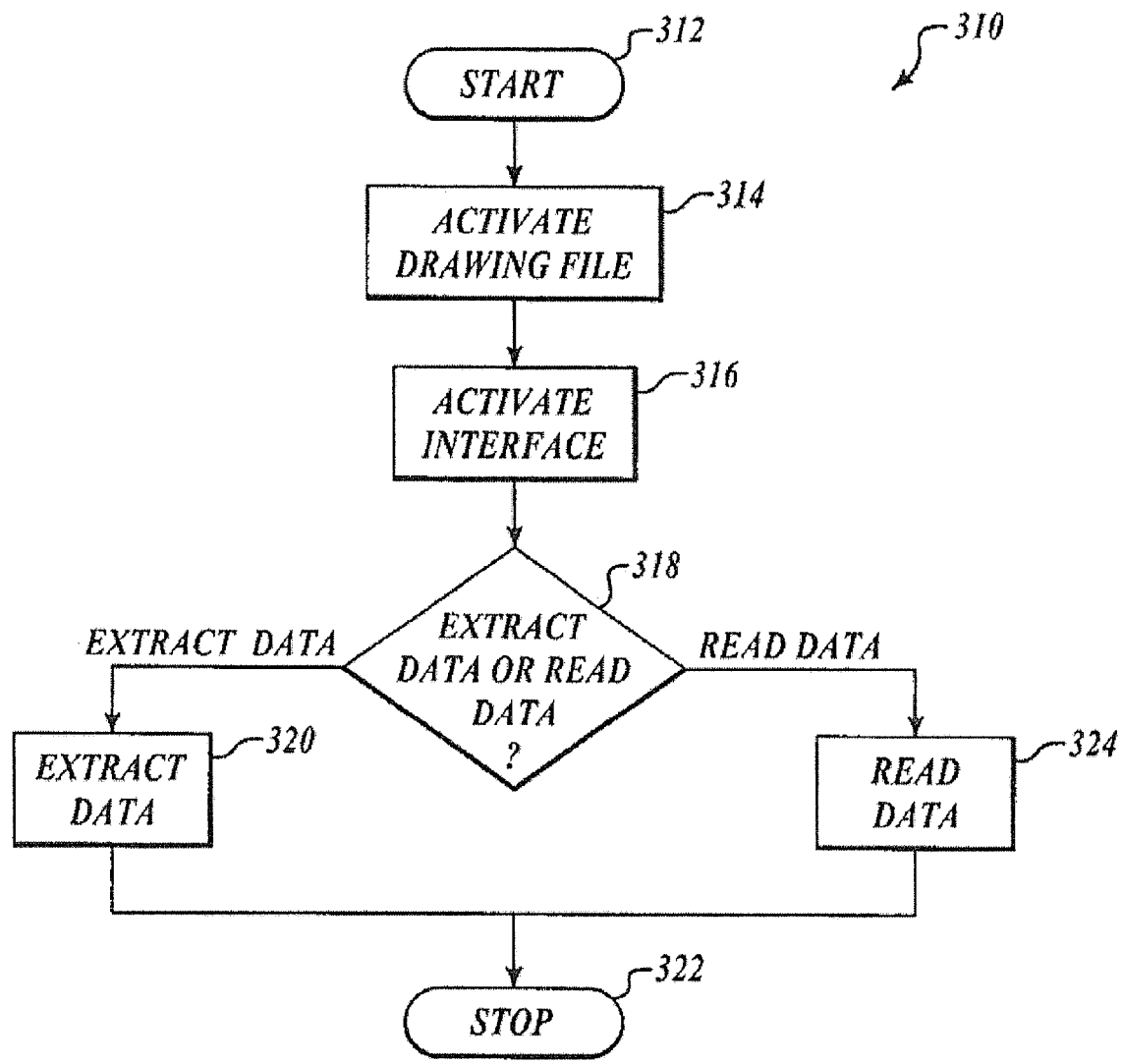
FIG. 10 is a high-level flow chart of an exemplary method according to an embodiment.

Referring now to FIG. 10 and given by way of overview, a method for automatically processing geometry data begins at a block 312. At a block 314 a drawing file, from which geometry data is to be extracted, is activated. The drawing file suitably is a file for a type of drawing application that enables accessing of geometry data, such as without limitation CATIA V5. The drawing file includes geometry data defined by points and lines, as discussed above. Thus, the drawing file may be a drawing file that may be used at an early or preliminary stage in a design process. If the drawing file is a drawing file for a product made of parts that are integrated together, then the drawing file may also include integration data, as described above. Optionally, the drawing file may, but is not required to, also include information regarding properties and materials. Properties and materials information has also been discussed above.

At a block 316 an interface application is activated. The interface application is any interface application that is configured to interface with the activated drawing file and either extract geometry data from the activated drawing file or read geometry data.

At a decision block 318, a determination is made regarding which process to perform with the geometry data—that is, whether to extract data or to read data. When it is desired to extract data, at a block 320 geometry data is extracted from the activated geometry file by the interface application. Details of exemplary, non-limiting functionality for extracting geometry data from the activated drawing file will be discussed below. In addition, an exemplary, non-limiting implementation of functionality for extracting geometry data from the activated drawing file will be discussed below. After the geometry data has been extracted from the activated drawing file by the interface application, the method 310 can stop at a block 322.

Alternately, when it is desired to read geometry data, at a block 324 geometry data for a part, a series of parts, and/or a product is read. The geometry data can be generated by any suitable source for generating geometry data. The geometry data may be geometry data that has previously been extracted. Details of exemplary, non-limiting functionality for reading geometry data at the block 324 will be discussed below. After the data has been read at the block 324, the method 310 can stop at the block 322.

Figure 11:
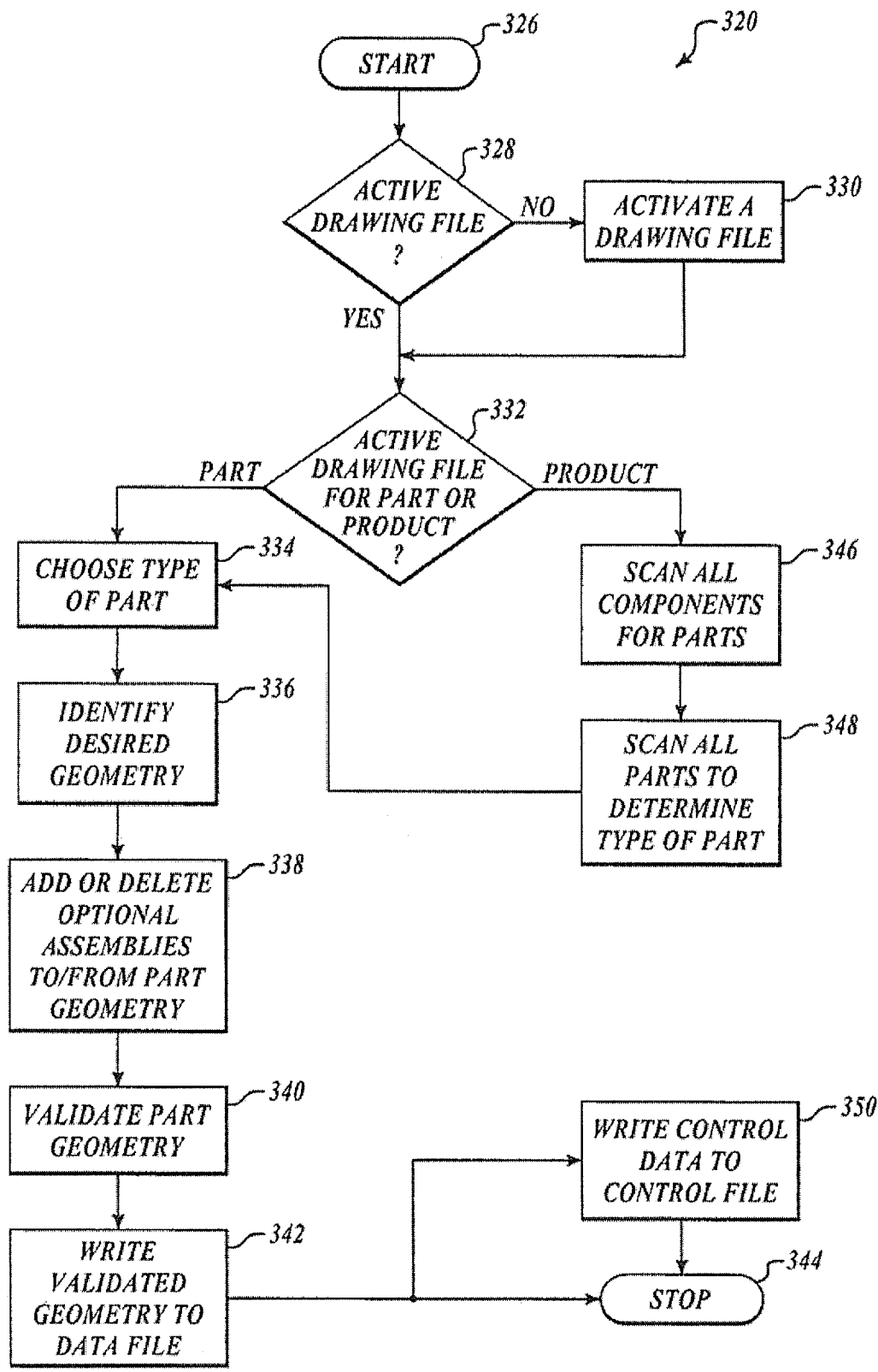
FIG. 11 is a flow chart of a method of extracting geometry data according to another exemplary embodiment.

Referring now to FIG. 11, exemplary, non-limiting functionality for extracting data at the block 320 will now be explained. Functionality for the block 326 begins at a block 326. At a decision block 328 a determination is made whether a drawing file has been activated. If a drawing file was not previously activated at the block 314 (FIG. 10), then at a block 330 a drawing file is activated.

After the drawing file is activated (either at the block 330 or at the block 314 (FIG. 10)), at a decision block 332 a determination is made whether the activated drawing file is a drawing file for one part or for a product that is made of component parts. While a part may be made of components, a part is not made of any components that are also parts. Conversely, a product is made of components that are parts.

When a drawing file is a drawing file for a part, at a block 334 the type of part (that is described in the activated drawing file) is selected. As discussed above, selection of the type of part (that is ultimately to be modeled) invokes predetermined modeling parameters. As also discussed above, the predetermined modeling parameters are associated with the selected type of part to be modeled and subsequently are used by a finite element modeling application, thereby highly automating the modeling process. As discussed above, the type of part to be modeled may be any type of part as desired. Details and non-limiting examples of the type of part to be modeled are discussed above and need not be repeated.

Once the type of part to be modeled is selected, at a block 336 desired geometry to be extracted from the activated drawing file for the type of part to be modeled is identified. The geometry data may include component nomenclature (used by the drawing application and the finite element model generation application) and a number of points used to define a component.

At a block 338, optional components of the part may be added or deleted, as desired.

At a block 340 the geometry data is validated. Validating geometry data ensures that a geometry datum of the drawing file for the component generally conforms to parameters expected by the finite element model generation application for the particular geometry datum. For example, a finite element model generation application may expect that geometry of a certain component is defined by a number of points in a range between a minimum number of points and a maximum number of points. Validating the geometry data thus can determine whether the number of points that define a component in a drawing file is within a predetermined range of points expected by a finite element model generation program. Alternately, a finite element model generation application may expect that geometry of a certain component is defined by a predetermined number of points. In this case, validating the geometry data can determine whether the number of points that define a component in a drawing file is equal to a predetermined number of points expected by a finite element model generation program.

Once the geometry data for the part is validated or any issues that prevent successful validation have been explored and possibly corrected, at a block 342 the geometry data is written to a data file. The functionality for the block 320 stops at a block 344.

If a determination is made at the decision block 332 that the activated drawing file is a drawing file for a product (that is made from more than one part), then functionality for the block 320 proceeds from the decision block 332 to a block 346. At the block 346 the components of the activated drawing file are scanned to determine which components are parts. At a block 348 all of the identified parts are scanned to determine the type of part. Once the type of part has been determined, then for each part the processing of the blocks 334, 336, 338, 340, and 342 is performed.

Once all of the component parts of the product have been processed at the blocks 334, 336, 338, 340, and 342, at a block 350 a control file is written. The control file contains identifying data for a product. Given by way of non-limiting example, contents of the control file may include: nomenclature of component parts of the product; storage location for the geometry data file for each component; group names for groups of component parts; or the like. After the control file is written, the functionality of the block 320 stops at the block 344.

Figure 12:
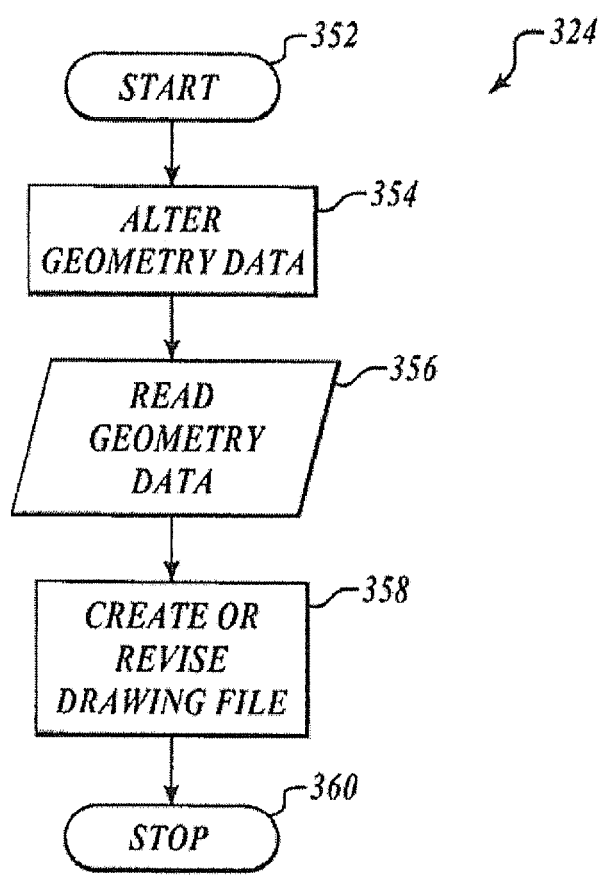
FIG. 12 is a flow chart of a method of reading geometry data according to another exemplary embodiment.

Referring now to FIG. 12, exemplary, non-limiting functionality for reading geometry data for a part, a series of parts, and/or a product at the block 324 will now be explained. Reading the geometry data thus permits changes to be made to geometry data external to a computer aided drawing application and fed back to the computer aided drawing application, thereby "closing the loop".

The block 324 begins at a block 352. If desired, at an optional block 354 an existing file with geometry data may be accessed and the existing geometry data may be altered or revised as desired for a particular application. Such revision or alteration of geometry data can thus permit trade studies to be performed quickly and easily.

At an input block 356 geometry data is read. The geometry data may be generated from any suitable source, like a computer aided drawing application such as without limitation CATIA, Unigraphics, Pro-E, or the like. Moreover, the geometry data may have already been extracted from a drawing file. Even further, the geometry data may have been altered or revised at the block 354. The geometry data may be read from any suitable file, such as without limitation a text file, a word processing document, a database file, a spreadsheet, or the like. In addition, a control file (as discussed above) may also be read at the input block 356 when the geometry data describes a product.

At a block 358, a drawing file in any suitable computer aided drawing application like CATIA or Unigraphics or Pro-E or the like can be created from the geometry data read at the input block 356. If the geometry data was altered or revised at the block 354, then at the block 358 a revised drawing file can be created. Processing for the block 324 stops at a block 360.

Figure 13:
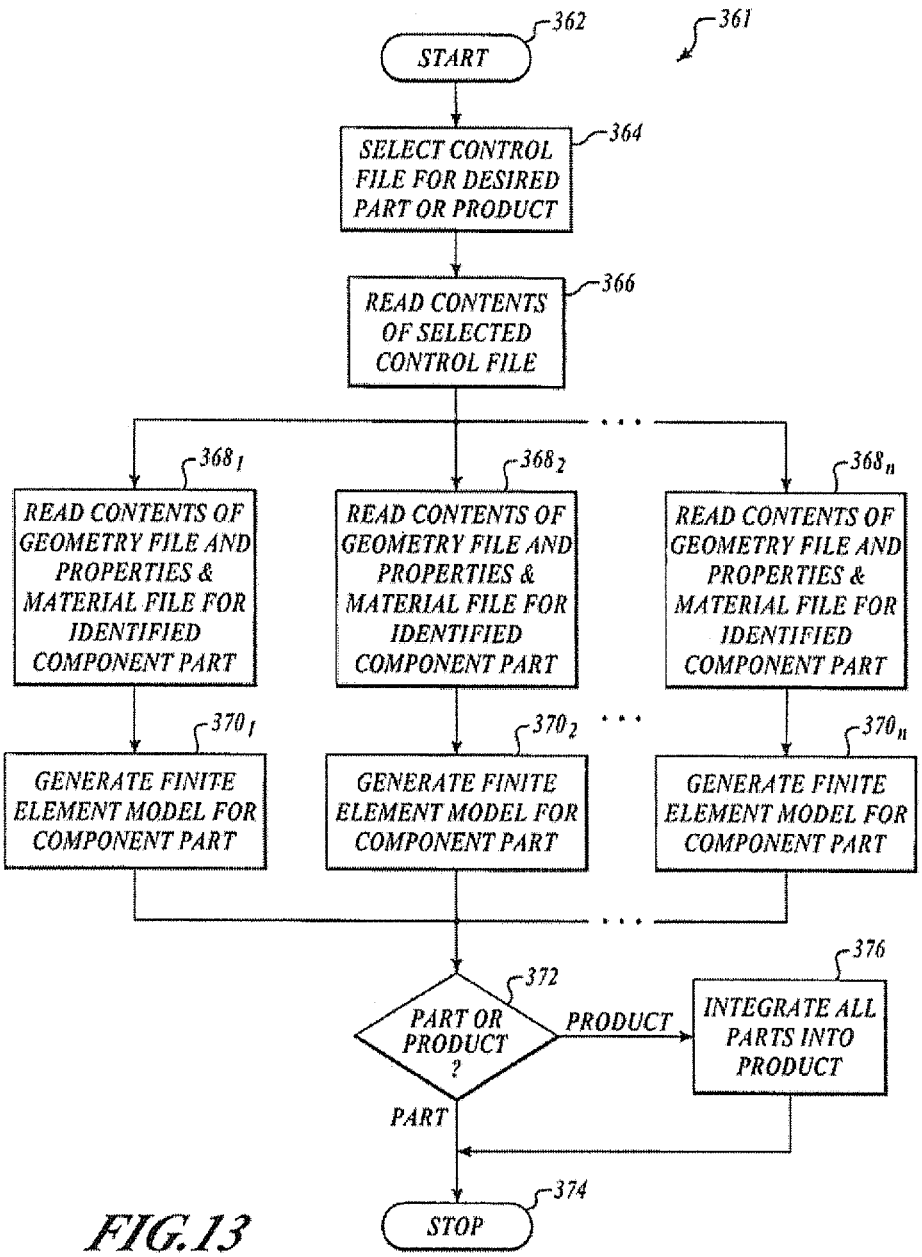
FIG. 13 is a flow chart of a method of generating a finite element model according to another exemplary embodiment.

Referring now to FIG. 13, exemplary, non-limiting functionality for generating a finite element model at the block 324 will now be explained. Functionality for the block 324 begins at a block 362. At a block 364 a control file, described above, is selected for a product to be modeled.

At a block 366 the contents of the control file are read. As discussed above, the control file contains identifying data for a product. Given by way of non-limiting example, contents of the control file may include: nomenclature of component parts of the product; storage location for the geometry data file for each component; group names for groups of component parts; or the like.

Contents of geometry files for all component parts identified in the control file are read simultaneously. At a block $368_1$ contents of the geometry data file (and, if applicable, a properties and material file) for a first component part are read. In the event that more than one component part is identified in the control file, at a block $368_2$ contents of the geometry data file (and, if applicable, a properties and material, file) for a second component part identified in the control file are read simultaneously. The contents of up to n geometry data files for n component parts identified in the control file may be read simultaneously (and, if applicable, a properties and material file) for up to n component parts up through a block $368_n$.

Contents of geometry files for all component parts identified in the control file are processed simultaneously by a finite element model generation application, thereby simultaneously generating finite element models for all of the component parts identified in the control file. At a block $370_1$ the contents of the geometry data file (and, if applicable, a properties and material file) for a first component part are processed by a finite element model generation program and a finite element model is generated for the first component part. In the event that more than one component part is identified in the control file, at a block $370_2$ the contents of the geometry data file (and, if applicable, a properties and material file) for a second component part identified in the control file are processed simultaneously by the finite element model generation program and a finite element model is generated for the second component part. The contents of up to n geometry data files for n component parts identified in the control file may be processed simultaneously (and, if applicable, a properties and material file) for up to n component parts up through a block $370_n$. To that end, at the block $370_n$ the contents of the geometry data file (and, if applicable, a properties and material file) for an $n^{th}$ component part identified in the control file are processed simultaneously by the finite element model generation program and a finite element model is generated for the $n^{th}$ component part.

At a decision block 372 a determination is made if one finite element model has been generated for a part or if more than one (that is, up to n) finite element model has been generated for component parts of a product. If the finite element model is for a part, then functionality for the block 361 stops at a block 374. If finite element models of up to n component parts of a product have been generated, then at a block 376 a finite element model generation program uses integration data (such as integration point data from the geometry data file) to integrate the finite element models of the n component parts into a finite element model of the product. Details of integration have been discussed above and need not be repeated for an understanding. After the finite element models of the n component parts have been integrated into a finite element model of the product, functionality for the block 361 stops at the block 374.

Referring now to FIGS. 1, 10, 11, 12, and 13, functionality of the method 310, including functionality of the blocks 320 and 324, and functionality of the method 361 suitably are executed by the system 10. Details of the system 10 are discussed above and need not be repeated for an understanding.

Figure 14A:
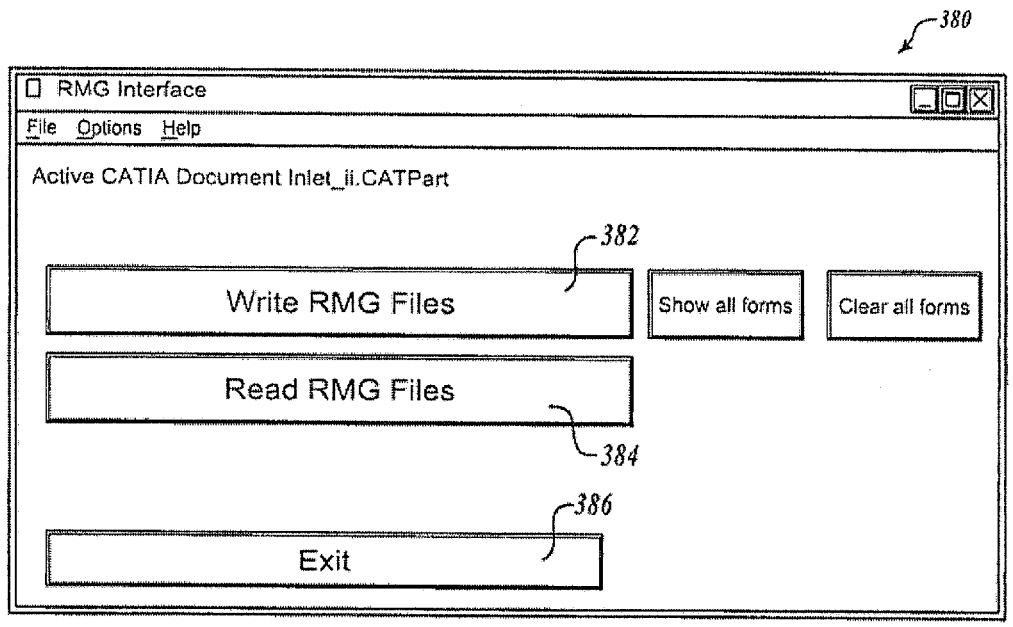
FIGS. 14A-14F are screen shots of an exemplary implementation of embodiments.

Exemplary, non-limiting implementations of functionality of the method 310, including functionality of the blocks 320 and 324, and of the method 361 will now be discussed in the context of a non-limiting, exemplary interface application. Referring now to FIG. 14A, a screen 380 of an interface application is presented upon activation of an exemplary interface application, such as at the block 316 (FIG. 10). A button 382 is clicked to extract geometry data from an activated drawing file. Clicking the button 382 starts execution of the block 320 (FIG. 11). A button 384 is clicked to read geometry data. Clicking the button 384 starts execution of the block 324 (FIG. 12). A button 386 can be clicked to exit the interface application.

Figure 14B:
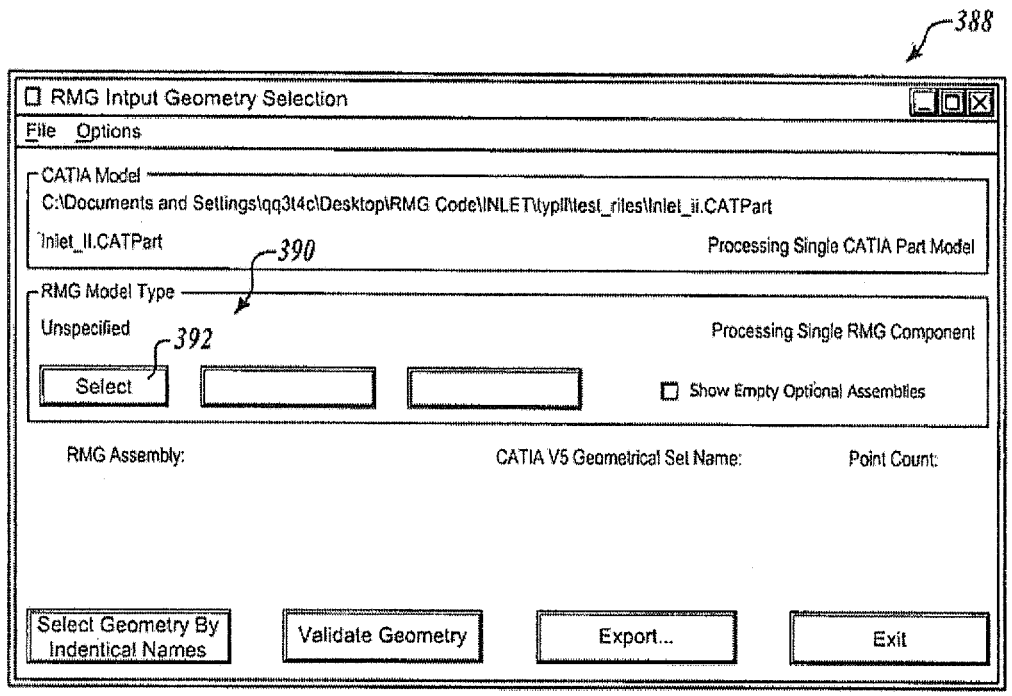

An exemplary implementation of extracting geometry data will now be discussed. Referring now to FIG. 14B, when the button 382 (FIG. 14A) is clicked, a screen 388 results. The screen 388 represents the beginning of an exemplary implementation of the block 334 (FIG. 11) in which a type of part is chosen. A box 390 displays a type of part, as defined by the finite element model generation program, for which geometry data is to be extracted from the activated drawing file. The box 390 indicates that the type of part is "Unspecified". A button 392 is clicked to select a type of part for which the geometry data is to be extracted from the activated drawing file.

Figure 14C:
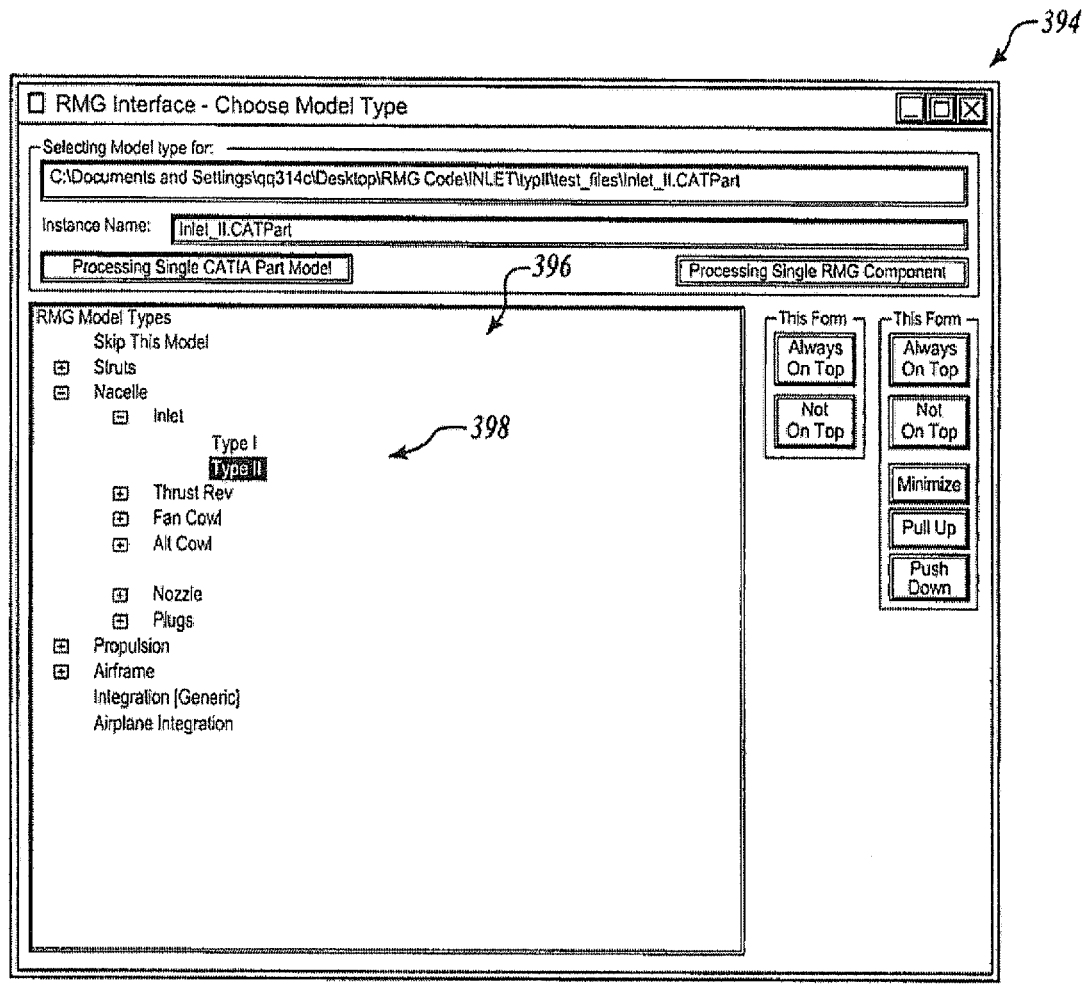

Referring now to FIG. 14C, a screen 394 results when the button 392 (FIG. 14B) is clicked. A box 396 presents a selection tree 398 of parts set forth in a hierarchical, nested list. The selection tree 398 is used to display and select the valid types of parts defined in a configuration file of a finite element model generation application. Branch names in the selection tree 398 can be identified by a plus or minus symbol next to the name of the type of part. Branches can be expanded or collapsed by clicking on the plus or minus symbol, or by clicking on the branch name itself. Actual part type selections do not have a plus or minus symbol next to them. A type of part is selected by clicking on the name of the type of part. Once a part type is selected the screen 394 will be dismissed and the selected type of part will be used for further processing.

Figure 14D:
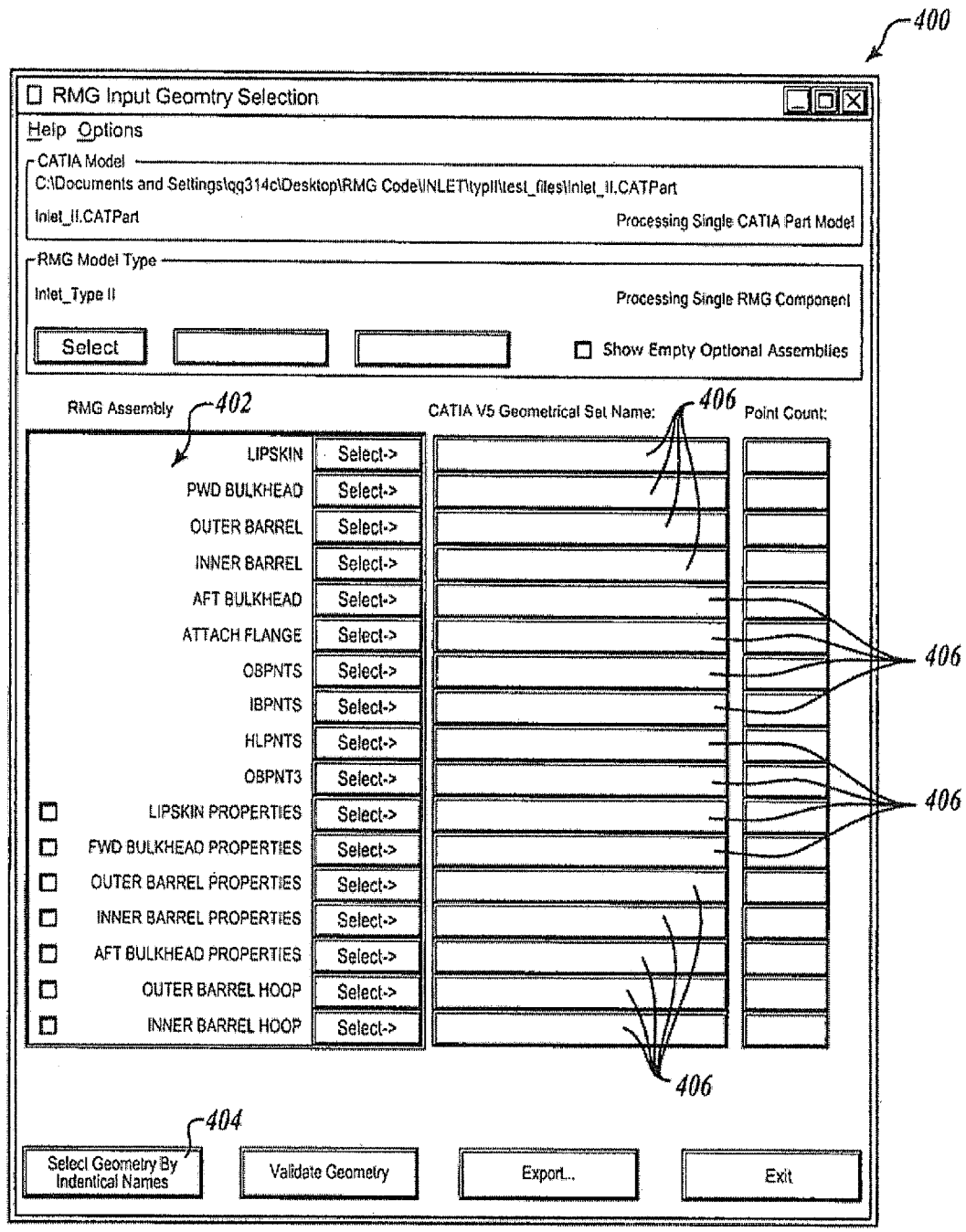

Referring now to FIG. 14D, once the type of part has been selected and the screen 394 (FIG. 14C) has been dismissed, a screen 400 is presented for selecting geometry. The screen 400 represents the beginning of an exemplary implementation of the block 336 (FIG. 11) in which desired geometry is identified. A box 402 is populated with names that are used by the finite element model generating application of components for the type of part selected at the screen 394 (FIG. 14D).

Geometry data may be selected for extraction from the activated drawing file by clicking on a button 404. When the button 404 is clicked, the activated drawing file is scanned for geometry data sets. Fields 406 will be populated automatically with names of the component or property as geometry data sets with identical names that match the names in the box 402 are located in the activated drawing file.

Figure 14E:
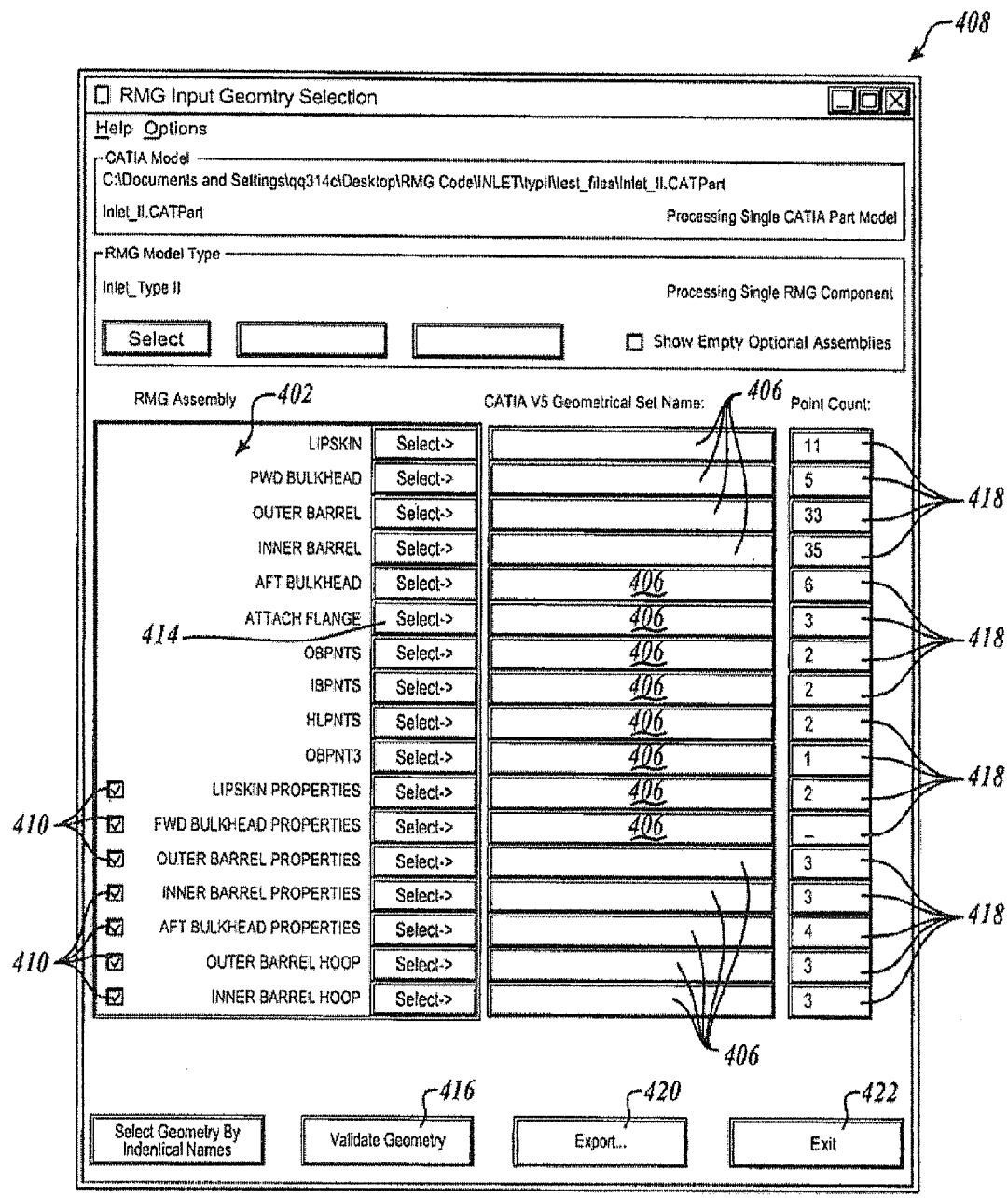

Referring now to FIG. 14E, a screen 408 results when the activated drawing file contains geometry sets with names that match the names in the box 402 (that is, the names that the finite element model generation application uses for the components). The fields 406 are populated with names used by the activated drawing file for the corresponding component shown in the box 402. In this case, all of the fields 406 are populated because the activated drawing file contains geometry sets that match all of the names for components listed in the box 402.

A check box 410 indicates that a component is an optional component. The check box 410 represents an exemplary implementation of the block 338 (FIG. 11) in which optional assemblies are added or deleted to or from part geometry. The check box 410 can be clicked to include an optional component or can be left un-clicked to exclude an optional component. A check mark is shown in the check box 410 when the check box 410 is clicked. In this case, the check boxes 410 for all of the optional components have been clicked, and therefore each check box 410 includes a check mark.

Figure 14F:
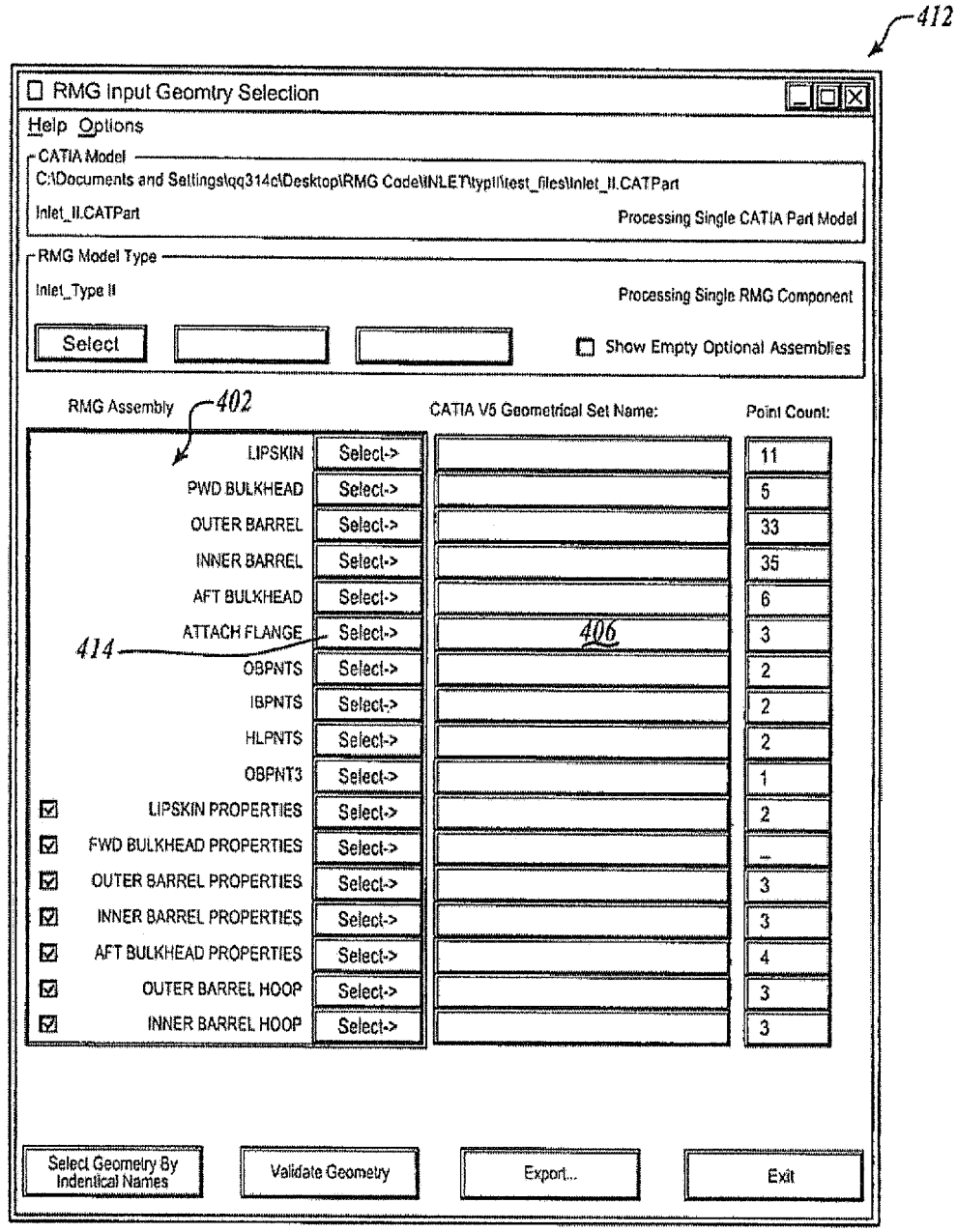

Referring now to FIG. 14F, a screen 412 results when one or more of the component names in the box 402 do not match names of geometry sets of the activated drawing file. After the activated drawing file has been scanned, no geometry set name will appear in the field 406 for any component in the box 402 that does not match a geometry set of the activated drawing file. In such a case, desired geometry can be selected by clicking on a button 414 next to the empty field 406. When the button 414 is clicked, a list of geometry sets in the activated drawing file can be accessed and the desired geometry set can be selected. When the desired geometry set is selected from the activated drawing file, the name of the selected geometry set will appear in the associated field 406. Thus, the name of the selected geometry set that appears in the previously-empty field 406 may be different from the name of the associated component that appears in the box 402.

Referring briefly now to FIGS. 14E and 14F, the button 414 also can be clicked to select a different geometry set from the geometry set of the activated drawing file that matches the name of the component listed in the box 402. Thus, even if all of the fields 406 are populated with names of geometry sets of the activated drawing file that match names of components in the box 402, an alternate geometry set can be selected from the activated drawing file by clicking on the button 414. As discussed above, the name of the different geometry set that appears in the re-populated field 406 may be different from the name of the associated component that appears in the box 402.

Referring back to FIG. 14E, once all the fields 406 are populated with names of desired geometry sets from the activated drawing file and all optional geometry data sets have been included or excluded, a button 416 is clicked to validate geometry. The button 416 represents an exemplary implementation of the block 340 (FIG. 11) in which part geometry is validated. When the button 416 is clicked, the activated drawing file is scanned to determine the number of input points that are used to define each component. A field 418 for each component is populated with the number of points detected in the geometry set of the activated drawing file that are used for defining geometry of the component.

The number of points entered in each field 418 is compared against a predetermined range of points that the finite element model generation application expects to be used for the component. For example, the range of points may reside in a configuration file for the finite element model generation application. If the number of points entered in a field 418 is within the predetermined range of points, then the geometry of the component has been validated. Validation of geometry for the component is communicated to a user in any suitable manner. For example, the background of the field 418 may be colored green. However, any acceptable manner of indicating successful validation may be used as desired.

If the number of points entered in a field 418 is not within the predetermined range of points, then the geometry of the component has not been validated. Unsuccessful validation of geometry for the component is communicated to a user in any suitable manner. For example, the background of the field 418 may be colored red. However, any acceptable manner of indicating unsuccessful validation may be used as desired. In the event of unsuccessful validation of geometry, the user can access the activated drawing file or the configuration file for the finite element model generation application, investigate discrepancies, and take corrective action as desired.

When the geometry has been successfully validated, or any discrepancies have been explored and any corrective action taken as desired, a button 420 is clicked to write the validated geometry to a data file. The button 420 represents an exemplary implementation of the block 342 (FIG. 11) in which validated geometry is written to a data file. The data file suitably is written in a format that can be accessed by a finite element model generation application. For example, the data file may be saved as a ".cv5" data file for use by a CATIA V5 application. However, the file may be saved in a format for use by other computer aided drawing applications such as Unigraphics or Pro-E or the like. When the data file has been written, a button 422 is clicked to exit.

Referring back to FIG. 14A, if the activated drawing file is a drawing file for a product and the button 382 is, clicked, then the exemplary implementation will attempt to process component products without user interaction. All components of the activated drawing file will be scanned for parts, and any detected component products will be ignored. All detected component parts will be scanned to determine their corresponding type of part as used in a finite element model generating application. If a component part is encountered for which the type of part does not match a type of part as used by a finite element model generating program, then the screen 388 is presented. Processing proceeds as described above. If a part is encountered for which not all components as referred to by a finite element model generating program match geometry sets of the activated drawing file, then the screen 400 is presented. Processing proceeds as described above, including geometry validation, and the data files are written.

An exemplary implementation of reading geometry data will now be discussed. Referring still to FIG. 14A, the button 384 is clicked to read geometry data. Clicking the button 384 starts execution of the block 324 (FIG. 12). When the button 384 is clicked, a standard "File Open" (not shown) dialog box is presented. A control file for an item that is desired to be modeled is selected. The selected control file is opened, and the user need not interact with the application any further. The contents of the selected control file are read automatically. Contents of all of the geometry files (and properties and material files, if any) that are identified in the control file are read automatically, thus implementing the functionality of the block 356 (FIG. 12). A drawing file can be automatically created in a suitable computer aided drawing application, thus implementing functionality of the block 358 (FIG. 12).

Alternately, a user can access an existing data file and alter or revise the exiting geometry data before clicking the button 384. Thus, the geometry data can be altered or revised external to the drawing application. After the geometry data has been accessed and revised, the button 384 can be clicked and the processing described above is performed. However, in this case the geometry data has been revised external to the drawing application and the drawing file has been revised according to the revised data, thereby permitting trade studies to be performed quickly and easily.

An exemplary implementation of generating a finite element model from extracted geometry data will now be discussed. The exemplary implementation is highly automated and, as a result, entails little interaction on the part of a user. Referring back to FIG. 9A, the user selects a type of part or product to be modeled by any suitable means. Selecting the type of part or product to be modeled starts execution of the block 361 (FIG. 13). The user need not interact with the application any further. When the type of part or product to be modeled is selected, a control file for the type of part or product to be modeled that is desired to be modeled is opened. The contents of the selected control file are read. Contents of all of the geometry files (and properties and material files, if any) that are identified in the control file are read simultaneously. A suitable finite element model generation application, such as that described above, simultaneously processes the contents that have been read from all of the geometry files (and properties and material files, if any). If the item to be modeled is a product, then all of the finite element models of the component parts of the product are integrated together, in an integration technique such as that described above.

FIGS. 2-14F are flowchart and screen shot illustrations of methods and computer program products according to disclosed embodiments. It will be understood that each block or step of the flowchart and screen shot illustrations, and combinations of blocks in the flowchart and screen shot illustrations, can be implemented by computer program instructions or other means, such as operator interaction. Although computer program instructions are discussed herein, for example, an apparatus according to disclosed embodiments can include other means, such as hardware or some combination of hardware and software, including one or more processors or controllers for extracting geometry data or generating a finite element model.

In this regard, FIG. 1 depicts the apparatus of one exemplary host embodiment including several of the key components of a general purpose computer 12 on which all of the disclosed embodiments may be implemented. Those of ordinary skill in the art will appreciate that a computer includes many more components than those shown in FIG. 1. However, it is not necessary that all of these generally conventional components be shown in order to disclose an illustrative embodiment. The computer 12 includes a processing unit 14 and a memory 18, which suitably includes random access memory (RAM) and read-only memory (ROM) of any acceptable variant. The computer 12 also includes storage 20, such as a hard disk drive, where data, such as drawing files and control files, and applications, such as drawing applications and finite element model generation applications, may be stored. The apparatus of the disclosed embodiments can also include input devices such as the keyboard 22, the pointing device 24, and the like, that are included in the computer 12. A monitor 28 is provided for viewing drawings, models, and screens of interface applications, and interacting with a user interface to request product, part, component, and other related operations. The apparatus of disclosed embodiments may be connected to one or more remote computers through a network via a network interface. The network suitably includes a local area network (LAN), a wide area network (WAN), an intranet, an extranet, or the Internet. As is known, the network interface includes all of the necessary circuitry for such a connection to the network. In one embodiment, the drawing files may be available on the remote computer(s) and accessible via the network. It will be appreciated that other embodiments are possible, including: a local drawing file collection, that is, all drawing files are stored on the computer 12; drawing files stored on a server and/or a client in a network environment; and the like.

Typically, computer program instructions may be loaded onto the computer or other programmable apparatus to produce a machine, such that the instructions which execute on the computer or other programmable apparatus create means for implementing the functions specified in the flowcharts or screen shot block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart or screen shot block(s) or step(s). The computer program instructions may also be loaded onto the computer or other programmable apparatus to cause a series of operational steps to be performed on the computer or other programmable apparatus to produce a computer implemented process such that the instructions which execute on the computer or other programmable apparatus provide steps for implementing the functions specified in the flowchart or screen shot block(s) or step(s).

Accordingly, blocks or steps of the flowchart or screen shot illustrations support combinations of means for performing the specified functions and program instruction means for performing the specified functions. It will also be understood that each block or step of the flowchart or screen shot illustrations, and combinations of blocks or steps in the flowchart or screen shot illustrations, can be implemented by special purpose hardware-based computer systems which perform the specified functions or steps, or combinations of special purpose hardware and computer instructions.

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A method comprising:
   identifying, at a processor, a number of points of drawing data included in a drawing file, the number of points associated with a part having a part type;
   selecting, at the processor, a threshold number of points from a data structure, the threshold number of points selected by the processor based on the part type;
   comparing, at the processor, the number of points to the threshold number of points to determine whether the number of points satisfies the threshold number of points; and
   writing geometry data based on the drawing data to a data file, wherein the geometry data is written based on a determination by the processor that the number of points satisfies the threshold number of points.

2. The method of claim 1, further comprising:
   initiating a presentation of a plurality of part types via a display, the plurality of part types based on the drawing file; and
   receiving a selection of the part type based on the presented plurality of part types, wherein the part type is selected prior to the threshold number of points being selected.

3. The method of claim 2, wherein the data structure includes information identifying the threshold number of points for the part type, and further comprising receiving the information identifying the threshold number of points from a finite element model generation application.

4. The method of claim 1, further comprising:
   receiving a selection of the drawing file, wherein the drawing data includes a plurality of points and a plurality of lines;
   activating, by the processor, the drawing file in response to the selection; and
   identifying, at the processor, the part type from the activated drawing file.

5. The method of claim 1, further comprising:
receiving, at the processor, a selection of the part from among multiple parts represented by the drawing data;
determining the part type of the selected part; and
extracting, by the processor, the drawing data from the drawing file based on the selection of the part, wherein the drawing data corresponds to the part, and wherein the number of points of the drawing data is determined based on the extracted drawing data.

6. The method of claim 1, further comprising:
receiving a control file from a finite element model generation application, wherein the control file includes the data structure, and wherein the data structure includes multiple threshold numbers of points that each corresponds to a different part type; and
accessing the data structure to select the threshold number of points from the multiple threshold numbers of points.

7. The method of claim 1, further comprising initiating generation of a finite element model at a finite element model generation application, the finite element model generated based on the geometry data, wherein the geometry data in the data file complies with a geometric requirement for generating the finite element model, and wherein the threshold number of points corresponds to a number of points specified by the finite element model generation application to enable the finite element model generation application to generate the finite element model.

8. An apparatus comprising:
a memory storing instructions; and
a processor coupled to the memory, wherein the processor is configured to execute the instructions to:
identify a number of points of drawing data included in a drawing file, the drawing data associated with a part having a part type;
identify a threshold number of points, the threshold number of points provided by a finite element model generation application, the finite element model generation application configured to generate a finite element model based on validated drawing data;
determine whether the number of points of drawing data satisfies the threshold number of points; and
initiate display of a first indicator to be provided via a user interface, wherein the first indicator indicates that the drawing data is the validated drawing data, the first indicator provided based on the number of points satisfying the threshold number of points.

9. The apparatus of claim 8, wherein the processor is configured to initiate display of a second indicator to be provided via the user interface, wherein the second indicator indicates that the drawing data is not validated when the number of points does not satisfy the threshold number of points.

10. The apparatus of claim 8, wherein the drawing file comprises a drawing sheet that identifies properties and materials associated with the part and that includes a two-dimensional centerline drawing of the part, and wherein the finite element model includes a three-dimensional representation of the part.

11. The apparatus of claim 8, wherein the threshold number of points is based on the part type, and wherein the number of points satisfy the threshold number of points when the number of points is equal to or greater than the threshold number of points.

12. The apparatus of claim 8, wherein the threshold number of points includes a range of a particular number of points, wherein the range of the particular number of points corresponds to a predetermined range of points expected by the finite element model generation application.

13. The apparatus of claim 12, wherein the range of the particular number of points includes a maximum number of points and a minimum number of points.

14. The apparatus of claim 8, wherein the processor is further configured to execute the instructions to:
after the first indication is provided, receive a request via the user interface to generate geometry data based on the drawing data and
write the geometry data in a format that is accessible by the finite element model generation application in response to the request.

15. A non-transitory computer-readable medium comprising instructions executable by a processor to cause the processor to:
receive first drawing data from a drawing file, the first drawing data corresponding to a two-dimensional representation of a first part;
determine a first number of points of the received first drawing data;
determine whether the first number of points satisfies a first threshold number of points; and
validate the first drawing data to be used to generate a finite element model based on the first number of points satisfying the first threshold number of points.

16. The non-transitory computer-readable medium of claim 15, further comprising instructions executable by the processor to cause the processor to:
receive a selection of the drawing file;
activate the drawing file including the first drawing data based on the selection, wherein the drawing file includes the first drawing data associated with the first part and second drawing data associated with a second part, wherein the first part and the second part have different part types;
determine a second number of points of the second drawing data and
validate the second drawing data to be used to generate the finite element model based on a determination that the second number of points satisfies a second threshold number of points, wherein the second threshold number of points is a different value than the first threshold number of points.

17. The non-transitory computer-readable medium of claim 15, further comprising instructions executable by the processor to cause the processor to:
receive a request via a user interface to validate the first drawing data;
in response to the request:
scanning the drawing file to identify the first number of points;
performing a comparison between the first number of points and the first threshold number of points; and
providing an indication via the user interface whether the first drawing data is validated based on the comparison.

18. The non-transitory computer-readable medium of claim 15, further comprising instructions executable by the processor to cause the processor to receive the first drawing data by reading the first drawing data from one of a text file, a word processing document, a database file, or a spreadsheet.

19. The non-transitory computer-readable medium of claim 15, wherein the first drawing data includes component nomenclature, and wherein the first number of points of the first drawing data define a geometry of the first part, and further comprising instructions executable by the processor to cause the processor to initiate a user interface via a display device, wherein the user interface enables selection of the drawing file, presentation of a count of the number of points, reception of a request to validate the drawing data, and presentation of an indication of whether the first drawing data is validated.

20. The non-transitory computer-readable medium of claim 15, further comprising instructions executable by the processor to cause the processor to:
   write the validated first drawing data to a geometry data file; and
   generate a control file, wherein the control file identifies a storage location of the geometry data file.

* * * * *